US010878065B2

(12) United States Patent
Grab et al.

(10) Patent No.: US 10,878,065 B2
(45) Date of Patent: *Dec. 29, 2020

(54) FEDERATED DIGITAL RIGHTS MANAGEMENT SCHEME INCLUDING TRUSTED SYSTEMS

(71) Applicant: DIVX, LLC, San Diego, CA (US)

(72) Inventors: Eric William Grab, San Diego, CA (US); Chris Russell, San Diego, CA (US); Francis Yee-Dug Chan, San Diego, CA (US); Michael George Kiefer, Lake Havasu City, AZ (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,265

(22) Filed: Oct. 23, 2017

(65) Prior Publication Data

US 2018/0060543 A1    Mar. 1, 2018

Related U.S. Application Data

(63) Continuation of application No. 14/928,746, filed on Oct. 30, 2015, now Pat. No. 9,798,863, which is a
(Continued)

(51) Int. Cl.
*G06F 21/10* (2013.01)
*H04N 21/222* (2011.01)
(Continued)

(52) U.S. Cl.
CPC ............ *G06F 21/10* (2013.01); *G06F 21/105* (2013.01); *H04L 9/3268* (2013.01);
(Continued)

(58) Field of Classification Search
CPC . G06F 21/10; G06F 21/105; H04N 21/26606; H04N 21/4627; H04N 21/8355;
(Continued)

(56) References Cited

U.S. PATENT DOCUMENTS

| 4,009,331 A | 2/1977 | Goldmark et al. |
| 4,694,357 A | 9/1987 | Rahman et al. |

(Continued)

FOREIGN PATENT DOCUMENTS

| AU | 2010203605 B2 | 5/2015 |
| CN | 1169229 | 12/1997 |

(Continued)

OTHER PUBLICATIONS

"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pgs.
(Continued)

*Primary Examiner* — Tongoc Tran
(74) *Attorney, Agent, or Firm* — KPPB LLP

(57) ABSTRACT

Federated systems for issuing playback certifications granting access to technically protected content are described. One embodiment of the system includes a registration server connected to a network, a content server connected to the network and to a trusted system, a first device including a non-volatile memory that is connected to the network and a second device including a non-volatile memory that is connected to the network. In addition, the registration server is configured to provide the first device with a first set of activation information in a first format, the first device is configured to store the first set of activation information in non-volatile memory, the registration server is configured to provide the second device with a second set of activation information in a second format, and the second device is configured to store the second set of activation information in non-volatile memory.

19 Claims, 12 Drawing Sheets

Related U.S. Application Data continuation of application No. 14/183,360, filed on Feb. 18, 2014, now Pat. No. 9,184,920, which is a continuation of application No. 13/489,409, filed on Jun. 5, 2012, now Pat. No. 9,656,183, which is a continuation of application No. 12/411,271, filed on Mar. 25, 2009, now Pat. No. 8,201,264, which is a continuation of application No. 11/685,929, filed on Mar. 14, 2007, now Pat. No. 7,515,710.

(60) Provisional application No. 60/782,215, filed on Mar. 14, 2006.

(51) Int. Cl.
    *H04N 21/266*      (2011.01)
    *H04N 21/4627*      (2011.01)
    *H04N 21/8355*      (2011.01)
    *H04L 9/32*      (2006.01)
    *H04L 29/06*      (2006.01)

(52) U.S. Cl.
    CPC ....... *H04L 63/0428* (2013.01); *H04N 21/222* (2013.01); *H04N 21/26606* (2013.01); *H04N 21/26613* (2013.01); *H04N 21/4627* (2013.01); *H04N 21/8355* (2013.01); *G06F 2221/0724* (2013.01)

(58) Field of Classification Search
    CPC ............ H04N 21/222; H04N 21/26613; H04L 9/3268; H04L 63/0428
    See application file for complete search history.

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,574,785 A | 11/1996 | Ueno et al. |
| 5,583,652 A | 12/1996 | Ware |
| 5,589,993 A | 12/1996 | Naimpally et al. |
| 5,600,721 A | 2/1997 | Kitazato |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A * | 5/1998 | Ryan ................... G06Q 20/123 340/5.26 |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,867,625 A | 2/1999 | McLaren |
| 5,887,110 A | 3/1999 | Sakamoto et al. |
| 5,892,900 A * | 4/1999 | Ginter ................... G06F 21/10 726/26 |
| 5,903,261 A | 5/1999 | Walsh et al. |
| 5,907,597 A | 5/1999 | Mark |
| 5,946,446 A | 8/1999 | Yanagihara |
| 5,956,729 A | 9/1999 | Goetz et al. |
| 5,959,690 A | 9/1999 | Toebes, VIII et al. |
| 5,970,147 A | 10/1999 | Davis |
| 5,999,812 A | 12/1999 | Himsworth |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,058,240 A | 5/2000 | McLaren |
| 6,064,794 A | 5/2000 | McLaren et al. |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 * | 1/2001 | Rosen ................... G06Q 20/02 380/279 |
| 6,195,388 B1 | 2/2001 | Choi et al. |
| 6,204,883 B1 | 3/2001 | Tsukagoshi |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,415,031 B1 | 7/2002 | Colligan et al. |
| 6,418,270 B1 | 7/2002 | Steenhof et al. |
| 6,449,719 B1 | 9/2002 | Baker |
| 6,466,671 B1 * | 10/2002 | Maillard ............... G06F 9/4843 348/E5.002 |
| 6,466,733 B1 | 10/2002 | Kim |
| 6,504,873 B1 | 1/2003 | Vehvilaeinen |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 | 9/2003 | Nilsson et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,690,838 B2 | 2/2004 | Zhou |
| 6,697,568 B1 | 2/2004 | Kaku |
| 6,725,281 B1 | 4/2004 | Zintel et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,868,525 B1 * | 3/2005 | Szabo ................... G06Q 30/02 715/738 |
| 6,917,652 B2 | 7/2005 | Lyu |
| 6,931,531 B1 | 8/2005 | Takahashi |
| 6,944,621 B1 | 9/2005 | Collart |

(56) References Cited

U.S. PATENT DOCUMENTS

| | | |
|---|---|---|
| 6,944,629 B1 | 9/2005 | Shioi et al. |
| 6,956,901 B2 | 10/2005 | Boroczky et al. |
| 6,957,350 B1 | 10/2005 | Demos |
| 6,965,724 B1 | 11/2005 | Boccon-Gibod et al. |
| 6,965,993 B2 | 11/2005 | Baker |
| 6,985,588 B1 | 1/2006 | Glick et al. |
| 6,988,144 B1 | 1/2006 | Luken et al. |
| 7,007,170 B2 | 2/2006 | Morten |
| 7,023,924 B1 | 4/2006 | Keller et al. |
| 7,043,473 B1 | 5/2006 | Rassool et al. |
| 7,103,906 B1 | 9/2006 | Katz et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,181,438 B1 * | 2/2007 | Szabo ............... G06F 21/6245 |
| 7,185,363 B1 | 2/2007 | Narin et al. |
| 7,197,234 B1 | 3/2007 | Chatterton |
| 7,206,940 B2 | 4/2007 | Evans et al. |
| 7,209,892 B1 | 4/2007 | Galuten et al. |
| 7,231,132 B1 | 6/2007 | Davenport |
| 7,237,061 B1 | 6/2007 | Boic |
| 7,242,772 B1 | 7/2007 | Tehranchi |
| 7,243,346 B1 | 7/2007 | Seth et al. |
| 7,295,673 B2 | 11/2007 | Grab et al. |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,356,245 B2 | 4/2008 | Belknap et al. |
| 7,366,788 B2 | 4/2008 | Jones et al. |
| 7,376,831 B2 | 5/2008 | Kollmyer et al. |
| 7,406,174 B2 | 7/2008 | Palmer |
| 7,421,411 B2 | 9/2008 | Kontio et al. |
| 7,454,780 B2 | 11/2008 | Katsube et al. |
| 7,457,359 B2 | 11/2008 | Mabey et al. |
| 7,457,415 B2 | 11/2008 | Reitmeier et al. |
| 7,460,668 B2 | 12/2008 | Grab et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,938 B2 | 3/2009 | Collart |
| 7,515,710 B2 | 4/2009 | Russell et al. |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,788,271 B2 | 8/2010 | Soma et al. |
| 7,817,608 B2 | 10/2010 | Rassool et al. |
| 7,869,691 B2 | 1/2011 | Kelly et al. |
| 7,882,034 B2 | 2/2011 | Hug et al. |
| 7,949,703 B2 | 5/2011 | Matsuzaki et al. |
| 7,962,942 B1 | 6/2011 | Craner |
| 7,974,714 B2 | 7/2011 | Hoffberg |
| 7,984,513 B1 * | 7/2011 | Kyne ................... G06F 21/10 706/47 |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,082,442 B2 | 12/2011 | Keljo et al. |
| 8,195,714 B2 | 6/2012 | Mckibben et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,243,924 B2 | 8/2012 | Chen et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 | 9/2012 | Ram et al. |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu et al. |
| 8,311,115 B2 | 11/2012 | Gu et al. |
| 8,321,556 B1 | 11/2012 | Chatterjee et al. |
| 8,341,715 B2 | 12/2012 | Sherkin et al. |
| 8,386,621 B2 | 2/2013 | Park |
| 8,396,114 B2 | 3/2013 | Gu et al. |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Shoham et al. |
| 8,456,380 B2 | 6/2013 | Pagan |
| 8,472,792 B2 | 6/2013 | Butt et al. |
| 8,473,630 B1 | 6/2013 | Galligan et al. |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,527,645 B1 | 9/2013 | Proffit et al. |
| 8,595,378 B1 | 11/2013 | Cohn |
| 8,606,069 B2 | 12/2013 | Okubo et al. |
| 8,640,166 B1 | 1/2014 | Craner et al. |
| 8,649,669 B2 | 2/2014 | Braness et al. |
| 8,656,183 B2 | 2/2014 | Russell et al. |
| 8,677,428 B2 | 3/2014 | Lewis et al. |
| 8,681,866 B1 | 3/2014 | Jia |
| 8,683,066 B2 | 3/2014 | Hurst et al. |
| 8,689,267 B2 | 4/2014 | Hunt |
| 8,726,264 B1 | 5/2014 | Allen et al. |
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,805,109 B2 | 8/2014 | Shoham et al. |
| 8,806,188 B2 | 8/2014 | Braness et al. |
| 8,832,434 B2 | 9/2014 | Apostolopoulos et al. |
| 8,843,586 B2 | 9/2014 | Pantos et al. |
| 8,849,950 B2 | 9/2014 | Stockhammer et al. |
| 8,856,218 B1 | 10/2014 | Inskip |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,535 B2 | 12/2014 | Ma et al. |
| 8,918,636 B2 | 12/2014 | Kiefer |
| 8,918,908 B2 | 12/2014 | Ziskind et al. |
| 8,948,249 B2 | 2/2015 | Sun et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,038,116 B1 | 5/2015 | Knox et al. |
| 9,042,670 B2 | 5/2015 | Carmel et al. |
| 9,060,207 B2 | 6/2015 | Scherkus et al. |
| 9,094,737 B2 | 7/2015 | Shivadas et al. |
| 9,098,335 B2 | 8/2015 | Muthiah et al. |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,457 B2 | 11/2015 | Van der Schaar |
| 9,197,685 B2 | 11/2015 | Soroushian |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |

(56) References Cited

U.S. PATENT DOCUMENTS

| | | |
|---|---|---|
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,479,805 B2 | 10/2016 | Rothschild et al. |
| 9,485,546 B2 | 11/2016 | Chen et al. |
| 9,571,827 B2 | 2/2017 | Su et al. |
| 9,584,557 B2 | 2/2017 | Panje et al. |
| 9,584,847 B2 | 2/2017 | Ma et al. |
| 9,621,522 B2 | 4/2017 | Kiefer et al. |
| 9,706,259 B2 | 7/2017 | Chan et al. |
| 9,712,890 B2 | 7/2017 | Shivadas et al. |
| 9,798,863 B2 | 10/2017 | Grab et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,967,189 B2 | 5/2018 | Patel et al. |
| 9,967,305 B2 | 5/2018 | Braness |
| 10,225,588 B2 | 3/2019 | Kiefer et al. |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0053222 A1 | 12/2001 | Wakao et al. |
| 2002/0026560 A1 | 2/2002 | Jordan et al. |
| 2002/0034252 A1 | 3/2002 | Owen et al. |
| 2002/0051494 A1* | 5/2002 | Yamaguchi ............ H04N 19/51 375/240.16 |
| 2002/0057898 A1 | 5/2002 | Normile |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0110193 A1* | 8/2002 | Yoo ........................ H04N 19/70 375/240.02 |
| 2002/0116481 A1 | 8/2002 | Lee |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0159598 A1 | 10/2002 | Rubinstein et al. |
| 2002/0161462 A1 | 10/2002 | Fay |
| 2002/0180929 A1 | 12/2002 | Tseng et al. |
| 2002/0184159 A1 | 12/2002 | Tadayon et al. |
| 2002/0184515 A1 | 12/2002 | Oho et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1* | 1/2003 | Masukura ............ H04N 11/042 348/441 |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1* | 2/2003 | Barrau ................ H04N 19/156 375/240.27 |
| 2003/0035545 A1 | 2/2003 | Jiang |
| 2003/0035546 A1 | 2/2003 | Jiang et al. |
| 2003/0041257 A1 | 2/2003 | Wee et al. |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078891 A1* | 4/2003 | Capitant ................ G06F 21/10 705/57 |
| 2003/0078930 A1 | 4/2003 | Surcouf et al. |
| 2003/0093799 A1* | 5/2003 | Kauffman ............... H04L 29/06 725/86 |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1* | 10/2003 | McVeigh ............ G11B 27/034 386/232 |
| 2003/0206558 A1 | 11/2003 | Parkkinen et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0022391 A1 | 2/2004 | Obrien |
| 2004/0024688 A1 | 2/2004 | Bi et al. |
| 2004/0025185 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |
| 2004/0071453 A1 | 4/2004 | Valderas |
| 2004/0081333 A1 | 4/2004 | Grab et al. |
| 2004/0081434 A1 | 4/2004 | Jung et al. |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0004875 A1 | 1/2005 | Kontio et al. |
| 2005/0005025 A1 | 1/2005 | Harville et al. |
| 2005/0008385 A1 | 1/2005 | Kocher |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0063541 A1 | 3/2005 | Candelore |
| 2005/0071280 A1* | 3/2005 | Irwin .................... H04L 9/0825 705/59 |
| 2005/0108320 A1 | 5/2005 | Lord et al. |
| 2005/0114534 A1 | 5/2005 | Lee |
| 2005/0114896 A1 | 5/2005 | Hug |
| 2005/0149450 A1 | 7/2005 | Stefik et al. |
| 2005/0177741 A1 | 8/2005 | Chen et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0223412 A1* | 10/2005 | Nadalin ............ G06F 21/6209 726/3 |
| 2005/0254508 A1 | 11/2005 | Aksu et al. |
| 2005/0273695 A1 | 12/2005 | Schnurr |
| 2005/0275656 A1 | 12/2005 | Corbin et al. |
| 2006/0015580 A1 | 1/2006 | Gabriel et al. |
| 2006/0026294 A1 | 2/2006 | Virdi et al. |
| 2006/0026302 A1 | 2/2006 | Bennett et al. |
| 2006/0036549 A1* | 2/2006 | Wu .................... H04N 7/17318 705/51 |
| 2006/0037057 A1 | 2/2006 | Xu |
| 2006/0052095 A1 | 3/2006 | Vazvan |
| 2006/0053080 A1* | 3/2006 | Edmonson ............ G06F 21/10 705/59 |

(56) References Cited

U.S. PATENT DOCUMENTS

| | | |
|---|---|---|
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki et al. |
| 2006/0129909 A1 | 6/2006 | Butt et al. |
| 2006/0168639 A1 | 7/2006 | Gan et al. |
| 2006/0173887 A1 | 8/2006 | Breitfeld et al. |
| 2006/0179239 A1 | 8/2006 | Fluhr |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0201695 A1* | 8/2007 | Saarikivi ............ H04N 7/1675 380/231 |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0271385 A1 | 11/2007 | Davis et al. |
| 2007/0271830 A1* | 11/2007 | Holt ..................... F41A 17/063 42/70.01 |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0046718 A1 | 2/2008 | Grab et al. |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086747 A1 | 4/2008 | Rasanen et al. |
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0137541 A1 | 6/2008 | Agarwal et al. |
| 2008/0137736 A1 | 6/2008 | Richardson et al. |
| 2008/0151817 A1 | 6/2008 | Fitchett |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0201705 A1 | 8/2008 | Wookey |
| 2008/0205860 A1 | 8/2008 | Holtman |
| 2008/0209534 A1 | 8/2008 | Keronen et al. |
| 2008/0240144 A1 | 10/2008 | Kruse et al. |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0165148 A1 | 6/2009 | Frey et al. |
| 2009/0168795 A1 | 7/2009 | Segel et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0265737 A1 | 10/2009 | Issa et al. |
| 2009/0276636 A1 | 11/2009 | Grab et al. |
| 2009/0282162 A1 | 11/2009 | Mehrotra et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142915 A1 | 6/2010 | McDermott et al. |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |

(56) References Cited

U.S. PATENT DOCUMENTS

| | | |
|---|---|---|
| 2010/0313226 A1 | 12/2010 | Cholas et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0016225 A1 | 1/2011 | Park et al. |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0173345 A1 | 7/2011 | Knox et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0246661 A1 | 10/2011 | Manzari et al. |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0042090 A1 | 2/2012 | Chen et al. |
| 2012/0066360 A1 | 3/2012 | Ghosh |
| 2012/0093214 A1 | 4/2012 | Urbach |
| 2012/0114302 A1 | 5/2012 | Randall |
| 2012/0124191 A1 | 5/2012 | Lyon |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0166633 A1 | 6/2012 | Baumback et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0311174 A1 | 12/2012 | Bichot et al. |
| 2012/0314778 A1 | 12/2012 | Salustri et al. |
| 2012/0317235 A1 | 12/2012 | Nguyen et al. |
| 2012/0331167 A1 | 12/2012 | Hunt |
| 2013/0007223 A1 | 1/2013 | Luby et al. |
| 2013/0013730 A1 | 1/2013 | Li et al. |
| 2013/0013803 A1 | 1/2013 | Bichot et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170561 A1 | 7/2013 | Hannuksela |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1 | 8/2013 | Luby et al. |
| 2013/0227122 A1 | 8/2013 | Gao |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman, II et al. |
| 2014/0096171 A1 | 4/2014 | Shivadas et al. |
| 2014/0101722 A1 | 4/2014 | Moore |
| 2014/0115650 A1 | 4/2014 | Zhang et al. |
| 2014/0119432 A1 | 5/2014 | Wang et al. |
| 2014/0140253 A1 | 5/2014 | Lohmar et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |

(56) References Cited

U.S. PATENT DOCUMENTS

| | | |
|---|---|---|
| 2014/0241420 A1 | 8/2014 | Orton-jay et al. |
| 2014/0241421 A1 | 8/2014 | Orton-jay et al. |
| 2014/0247869 A1 | 9/2014 | Su et al. |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0026677 A1 | 1/2015 | Stevens et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0288996 A1 | 10/2015 | Van Der Schaar et al. |
| 2015/0334435 A1 | 11/2015 | Shivadas et al. |
| 2015/0373421 A1 | 12/2015 | Chan et al. |
| 2016/0070890 A1 | 3/2016 | Grab et al. |
| 2016/0112382 A1 | 4/2016 | Kiefer et al. |
| 2016/0149981 A1 | 5/2016 | Shivadas et al. |
| 2016/0219303 A1 | 7/2016 | Braness et al. |
| 2017/0214947 A1 | 7/2017 | Kiefer et al. |
| 2017/0280203 A1 | 9/2017 | Chan et al. |
| 2018/0007451 A1 | 1/2018 | Shivadas et al. |
| 2018/0131980 A1 | 5/2018 | Van Der Schaar et al. |
| 2018/0220153 A1 | 8/2018 | Braness et al. |
| 2019/0020907 A1 | 1/2019 | Kiefer et al. |
| 2019/0045234 A1 | 2/2019 | Kiefer et al. |

FOREIGN PATENT DOCUMENTS

| | | |
|---|---|---|
| CN | 1221284 A | 6/1999 |
| CN | 1723696 | 1/2006 |
| EP | 757484 A2 | 2/1997 |
| EP | 813167 A2 | 12/1997 |
| EP | 0936812 A1 | 8/1999 |
| EP | 1056273 A2 | 11/2000 |
| EP | 1187483 A2 | 3/2002 |
| EP | 1420580 A1 | 5/2004 |
| EP | 1553779 A1 | 7/2005 |
| EP | 1657835 A1 | 5/2006 |
| EP | 1718074 A1 | 11/2006 |
| EP | 2486517 A1 | 8/2012 |
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 | 7/2013 |
| EP | 2661696 A1 | 11/2013 |
| EP | 2661875 A1 | 11/2013 |
| EP | 2661895 A2 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 | 12/2014 |
| EP | 2751990 A4 | 4/2015 |
| FR | EP2360923 | 8/2011 |
| JP | 08046902 A | 2/1996 |
| JP | 08111842 A | 4/1996 |
| JP | 08163488 A | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 02001043668 A | 2/2001 |
| JP | 2001209726 A | 8/2001 |
| JP | 2001346165 A | 12/2001 |
| JP | 2002164880 A | 6/2002 |
| JP | 2002170363 A | 6/2002 |
| JP | 2002518898 A | 6/2002 |
| JP | 2002218384 A | 8/2002 |
| JP | 2003179597 A | 6/2003 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2005027153 | 1/2005 |
| JP | 2005080204 A | 3/2005 |
| JP | 2006155500 A | 6/2006 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2009530917 A | 8/2009 |
| JP | 2013513298 A | 4/2013 |
| JP | 5200204 B2 | 6/2013 |
| JP | 2014506430 A | 3/2014 |
| JP | 5723888 B2 | 5/2015 |
| JP | 2015167357 A | 9/2015 |
| JP | 6038805 B2 | 12/2016 |
| JP | 6078574 B2 | 2/2017 |
| JP | 2017063453 | 3/2017 |
| KR | 100221423 B1 | 9/1999 |
| KR | 2002013664 | 2/2002 |
| KR | 1020020064888 A | 8/2002 |
| KR | 100669616 B1 | 1/2007 |
| KR | 1020130133830 | 12/2013 |
| KR | 101874907 B1 | 7/2018 |
| SG | 146026 | 12/2010 |
| WO | 1995015660 A1 | 6/1995 |
| WO | 1996013121 | 5/1996 |
| WO | 1997031445 A3 | 4/1998 |
| WO | 1999010836 A1 | 3/1999 |
| WO | 1999065239 A2 | 12/1999 |
| WO | 0104892 A1 | 1/2001 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A2 | 1/2002 |
| WO | 2002035832 A2 | 5/2002 |
| WO | 2002037210 A2 | 5/2002 |
| WO | 2002054196 A2 | 7/2002 |
| WO | 2003030000 A1 | 4/2003 |
| WO | 2003047262 A2 | 6/2003 |
| WO | 2003096136 A2 | 11/2003 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 20060012398 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2008086313 A1 | 7/2008 |
| WO | 2007113836 A3 | 11/2008 |

(56) References Cited

FOREIGN PATENT DOCUMENTS

| | | | |
|---|---|---|---|
| WO | 2008135932 | A2 | 11/2008 |
| WO | 2007113836 | B1 | 12/2008 |
| WO | 2009065137 | A1 | 5/2009 |
| WO | 2010060106 | A1 | 5/2010 |
| WO | 2010080911 | A1 | 7/2010 |
| WO | 2010089962 | A1 | 8/2010 |
| WO | 2010108053 | A1 | 9/2010 |
| WO | 2010111261 | A1 | 9/2010 |
| WO | 2010122447 | A1 | 10/2010 |
| WO | 2010147878 | A1 | 12/2010 |
| WO | 2011042898 | A1 | 4/2011 |
| WO | 2011042900 | A1 | 4/2011 |
| WO | 2011068668 | A1 | 6/2011 |
| WO | 2011101371 | | 8/2011 |
| WO | 2011103364 | A1 | 8/2011 |
| WO | 2011132184 | A1 | 10/2011 |
| WO | 2011135558 | A1 | 11/2011 |
| WO | 2012035533 | A2 | 3/2012 |
| WO | 2012035534 | A2 | 3/2012 |
| WO | 2012035534 | A3 | 7/2012 |
| WO | 2012094171 | A1 | 7/2012 |
| WO | 20120094181 | A2 | 7/2012 |
| WO | 20120094189 | A1 | 7/2012 |
| WO | 2012035533 | A3 | 8/2012 |
| WO | 2012162806 | A1 | 12/2012 |
| WO | 2012171113 | A1 | 12/2012 |
| WO | 2013030833 | A1 | 3/2013 |
| WO | 2013032518 | A2 | 3/2013 |
| WO | 2013103986 | A2 | 7/2013 |
| WO | 2013111126 | A2 | 8/2013 |
| WO | 2013032518 | A3 | 9/2013 |
| WO | 2013144942 | A1 | 10/2013 |
| WO | 2014145901 | A1 | 9/2014 |
| WO | 2014193996 | A2 | 12/2014 |
| WO | 2014193996 | A3 | 2/2015 |
| WO | 2015031982 | A1 | 3/2015 |
| WO | 2013111126 | A3 | 6/2015 |

OTHER PUBLICATIONS

"Information Technology—Coding of Audio Visual Objects—Part 2: Visual" International Standard, ISO/IEC 14496-2, Third Edition, Jun. 1, 2004, pp. 1-724. (presented in three parts).

U.S. Appl. No. 13/905,804, "Notice of Allowance," dated Aug. 12, 2015, 8 pgs.

Broadq—The Ultimate Home Entertainment Software, printed May 11, 2009 from ittp://web.srchive.org/web/20030401122010/www.broadq.com/qcasttuner/, 1 page.

Cloakware Corporation, "Protecting Digital Content Using Cloakware Code Transformation Technology", Version 1.2, May 2002, pp. 1-10.

EP11774529 Supplementary European Search Report, completed Jan. 31, 2014, 2 pgs.

European Search Report Application No. EP 08870152, Search Completed May 19, 2011, dated May 26, 2011, 9 pgs.

European Search Report for Application 11855103.5, search completed Jun. 26, 2014, 9 pgs.

European Search Report for Application 11855237.1, search completed Jun. 12, 2014, 9 pgs.

European Supplementary Search Report for Application EP09759600, completed Jan. 25, 2011, 11 pgs.

Extended European Search Report for European Application EP10821672, completed Jan. 30, 2014, 3 pgs.

Extended European Search Report for European Application EP11824682, completed Feb. 6, 2014, 4 pgs.

Extended European Search Report for European Application No. 14763140.2, Search completed Sep. 26, 2016, dated Oct. 5, 2016, 9 pgs.

Federal Computer Week, "Tool Speeds Info to Vehicles", Jul. 25, 1999, 5 pgs.

Final draft ETSI ES 202 109, V1.1.1, ETSI Standard, Terrestrial Trunked Radio (TETRA); Security; Synchronization mechanism for end-to-end encryption, Oct. 2002, 17 pgs.

HTTP Live Streaming Overview, Networking & Internet, Apple, Inc., Apr. 1, 2011, 38 pgs.

IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.

InformationWeek, "Internet on Wheels", InformationWeek: Front End: Daily Dose, Jul. 20, 1999, Printed on Mar. 26, 2014, 3 pgs.

Adzic et al, "Optimized Adaptive HTTP Streaming for Mobile Devices", International Society for Optics and Photonics, Applications of Digital Image Processing XXXIV, vol. 8135, Sep. 2011, 10 pgs.

Akhshabi et al., "An Experimental Evaluation of Rate-Adaptation Algorithms in Adaptive Streaming over HTTP", MMSys'11, Feb. 23-25, 2011, 12 pgs.

Anonymous, "Method for the encoding of a compressed video sequence derived from the same video sequence compressed at a different bit rate without loss of data", ip.com, ip.com No. IPCOM000008165D, May 22, 2002, pp. 1-9.

Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.

Author Unknown, "Blu-ray Movie Bitrates Here—Blu-ray Forum", printed Oct. 30, 2008 from http://forum.blu-ray.com/showthread.php?t=3338, 6 pgs.

Author Unknown, "MPEG-4 Video Encoder: Based on International Standard ISO/IEC 14496-2", Patni Computer Systems, Ltd., printed Jan. 24, 2007, USA, pp. 1-15.

Author Unknown, "O'Reilly—802.11 Wireless Networks: The Definitive Guide, Second Edition", printed Oct. 30, 2008 from http://oreilly.com/catalog/9780596100520, 2 pgs.

Author Unknown, "Tunneling QuickTime RTSP and RTP over HTTP", Published by Apple Computer, Inc.: 1999 (month unknown) 6 pgs.

Author Unknown, "Turbo-Charge Your Internet and PC Performance", printed Oct. 30, 2008 from Speedtest.net—The Global Broadband Speed Test, 1 page.

Author Unknown, "White paper, The New Mainstream Wireless LAN Standard", Broadcom Corporation, Jul. 2003, 12 pgs.

Blasiak, "Video Transrating and Transcoding: Overview of Video Transrating and Transcoding Technologies", Ingenient Technologies, TI Developer Conference, Aug. 6-8, 2002, 22 pgs.

Bloom et al., "Copy Protection for DVD Video", Proceedings of the IEEE, vol. 87, No. 7, Jul. 1999, pp. 1267-1276.

Bocharov et al., "Portable encoding of audio-video objects: The Protected Interoperable File Format (PIFF)", Microsoft Corporation, Sep. 8, 2009, Revised: Mar. 9, 2010, 32 pgs.

Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013. (presented in three parts).

Casares, Juan et al. "Simplifying Video Editing Using Metadata", pp. 157-166.

Concolato et al., "Live HTTP Streaming of Video and Subtitles within a Browser", MMSys 2013, Feb. 26-Mar. 1, 2013, Oslo, Norway, 5 pgs.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.

Eskicioglu et al., "An Integrated Approach to Encrypting Scalable Video", Proceedings IEEE International Conference on Multimedia and Expo, Aug. 26-29, 2002, Lausanne, Switzerland, 4 pgs.

Fecheyr-Lippens, "A Review of HTTP Live Streaming", Internet Citation, Jan. 25, 2010, 38 pgs.

Gannes, "The Lowdown on Apple's HTTP Adaptive Bitrate Streaming", GigaOM, Jun. 10, 2009, 12 pgs.

(56) References Cited

OTHER PUBLICATIONS

Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 54? A Look at 802.11a, b and g Throughput", Aug. 8, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Hurtado Guzman, Juan Esteban "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, 10 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
I-O Data, "Innovation of technology arrived", from http://www.iodata.com/catalogs/AVLP2DVDLA_Flyer200505.pdf, 2 pgs.
Kaspar et al., "Using HTTP Pipelining to Improve Progressive Download over Multiple Heterogeneous Interfaces", IEEE ICC proceedings, 2010, 5 pgs.
Kim, Kyuheon "MPEG-2 ES/PES/TS/PSI", Kyung-Hee University, Oct. 4, 2010, 66 pgs.
Kozintsev et al., "Improving last-hop multicast streaming video over 802.11", Workshop on Broadband Wireless Multimedia, Oct. 2004, 10 pgs.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Li et al, "Content-Aware Playout and Packet Scheduling for Video Streaming Over Wireless Links", IEEE Transactions on Multimedia, vol. 10, No. 5, Aug. 2008, pp. 885-895.
Lian et al., "Efficient video encryption scheme based on advanced video coding", Multimed. Tools Appl. vol. 38, 2008, pp. 75-89.
Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, 19 pgs.
Long et al., "Silver: Simplifying Video Editing with Metadata", CHI 2003: New Horizons, Apr. 5-10, 2003, pp. 628-629.
Matroska, "Diagram", Matroska, Technical/Info, Diagram, 2016, retrieved from https://www.matroska.org/technical/diagram/index.html on Jul. 20, 2017, 9 pgs.
Matroska, "Specifications", Matroska, Technical/Info, Specifications, Jun. 25, 2017, retrieved from https://www.matroska.org/technical/specs/index.html on Jul. 20, 2017, 20 pgs.
Miras, "On Quality Aware Adaptation of Internet Video", University of London, PhD dissertation, 2004, 181 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
Moscoso, Pedro Gomes "Interactive Internet TV Architecture Based on Scalable Video Coding", Instituto Superior Techico, Universidad Technica de Lisboa, May 2011, 103 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Nelson, Mark "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Nelson, Michael "IBM's Cryptolopes", Complex Objects in Digital Libraries Course, Spring 2001, Retrieved from http://www.cs.odu.edu/~mln/teaching/unc/in1s210/?method=display&pkg_name=cryptolopes.pkg&element_name=cryptolopes.ppt, 12 pgs.
Noboru, "Play Fast and Fine Video on Web! codec", Co.9 No. 12, Dec. 1, 2003, 2 pgs.
Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, pp. 1-51.
Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html 7 pgs.
Oyman et al, "Quality of Experience for HTTP Adaptive Streaming Services", IEEE Communications Magazine, Apr. 2012, vol. 50, No. 4, DOI: 10.1109/MCOM.2012.6178830, pp. 20-27.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Ozer, Jan "Adaptive Streaming in the Field", Streaming Media, Dec. 2010-Jan. 2011, pp. 36-47.
Padiadpu, Rashmi "Towards Mobile Learning: A SCORM Player for the Google Android Platform", Master Thesis, Hamburg University of Applied Sciences, 2008, 66 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R "HTTP Live Streaming: draft-pantos-http-live-streaming-06", Published by the Internet Engineering Task Force (IETF), Mar. 31, 2011, 24 pgs.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Peek, David "Consumer Distributed File Systems", Dissertation, Doctor of Philosophy, Computer Science and Engineering, The University of Michigan, 2009, 118 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Rosenberg et al., "Indicating User Agent Capabilities in the Session Initiation Protocol (SIP)", Network Working Group, RFC 3840, Aug. 2004, 36 pgs.
Schulzrinne, H "Real Time Streaming Protocol 2.0 (RTSP): draft-ietfmmusic-rfc2326bis-27", MMUSIC Working Group of the Internet Engineering Task Force (IETF), Mar. 9, 2011, 296 pgs. (presented in two parts).
Siglin, "HTTP Streaming: What You Need to Know", streamingmedia.com, 2010, 15 pgs.

(56) References Cited

OTHER PUBLICATIONS

Siglin, "Unifying Global Video Strategies, MP4 File Fragmentation for Broadcast, Mobile and Web Delivery", Nov. 16, 2011, 16 pgs.
Silvia, "adaptive HTTP streaming for open codecs", Oct. 9, 2010, [retrieved on: Mar. 2, 2018, 15 pgs.
Tan, Yap-Peng et al., "Video transcoding for fast forward/reverse video playback", IEEE ICIP, 2002, 4 pgs.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 page.
Tripathi et al, "Improving Multimedia Streaming with Content-Aware Video Scaling", Retrieved from: http://digitalcommons.wpi.edu/computerscience-pubs/96, 2001, 17 pgs.
Unknown, "AVI RIFF File Reference (Direct X 8.1 C++ Archive)", printed from http://msdn.microsoft.com/archive/en-us/dx81_c/direct_cpp/htm/avirifffilereference.asp?fr on Mar. 6, 2006, 7 pgs.
Unknown, "Entropy and Source Coding (Compression)", TCOM 570, Sep. 1999, pp. 1-22.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, "IIS Smooth Streaming Technical Overview", Microsoft Corporation, Mar. 2009, 17 pgs.
International Preliminary Report for Application No. PCT/US2011/066927, Filed Dec. 22, 2011, Report dated Jul. 10, 2013, 13 pgs.
International Preliminary Report for International Application No. PCT/US2011/067243, International Filing Date Dec. 23, 2011, dated Jul. 10, 2013, 7 pgs.
International Preliminary Report on Patentability for International Application PCT/US14/30747, Report dated Sep. 15, 2015, dated Sep. 24, 2015, 6 pgs.
International Preliminary report on Patentability for International Application No. PCT/US2005/025845, report dated Jun. 19, 2007, 1 page.
International Preliminary Report on Patentability for International Application No. PCT/US2007/063950, Report Completed Dec. 18, 2009, 3 pgs.
International Preliminary Report on Patentability for International Application No. PCT/US2008/083816, dated May 18, 2010, 6 pgs.
International Preliminary Report on Patentability for International Application No. PCT/US2010/56733, dated Jun. 5, 2012, 5 pgs.
International Preliminary Report on Patentability for International Application No. PCT/US2011/068276, dated Mar. 4, 2014, 23 pgs.
International Preliminary Report on Patentability for International Application PCT/US2011/067167, dated Feb. 25, 2014, 8 pgs.
International Preliminary Report on Patentability for International Application PCT/US2013/043181, dated Dec. 31, 2014, dated Jan. 8, 2015, 11 pgs.
International Preliminary Report on Patentability for International Application PCT/US2014/039852, dated Dec. 1, 2015, dated Dec. 5, 2015, 8 pgs.
International Search Report and Written Opinion for International Application No. PCT/US07/63950, completed Feb. 19, 2008; dated Mar. 19, 2008, 9 pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, Completed May 24, 2007, dated Jun. 20, 2007, 6 pgs.
International Search Report and Written Opinion for International Application No. PCT/US2005/025845, completed Feb. 5, 2007 and dated May 10, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 7 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2011/067243, International Filing Date Dec. 23, 2011, Search Completed Apr. 24, 2012, dated May 8, 2012, 8 pgs.
International Search Report and Written Opinion for International Application No. PCT/US2013/043181, completed Nov. 27, 2013, dated Dec. 6, 2013, 12 pgs.
International Search Report and Written Opinion for International Application PCT/US14/30747, completed Jul. 30, 2014, dated Aug. 22, 2014, 7 pgs.
International Search Report and Written Opinion for International Application PCT/US14/39852, completed Oct. 21, 2014, dated Dec. 5, 2014, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, International Filing Date Jan. 7, 2013, Search Completed Mar. 19, 2013, dated Apr. 29, 2013, 10 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 1 page.
Linksys® : "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 23 pgs.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
Microsoft Windows® XP Media Center Edition 2005, Frequently asked Questions, printed May 4, 2007 from http://www.microsoft.com/windowsxp/mediacenter/evaluation/faq.mspx, 6 pgs.

(56) References Cited

OTHER PUBLICATIONS

Microsoft Windows® XP Media Center Edition 2005: Features, printed May 9, 2007, from http://www.microsoft.com/windowsxp/mediacenter/evaluation/features.mspx, 4 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
PC world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php, 1 page.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Written Opinion for International Application No. PCT/US2004/041667, Filing Date Dec. 8, 2004, Report Completed May 24, 2007, dated Jun. 20, 2007, 4 pgs.
Written Opinion for International Application No. PCT/US2005/025845, completed Feb. 5, 2007 and dated May 10, 2007, 5 pgs.
Written Opinion for International Application No. PCT/US2007/063950 filed Mar. 14, 2007, report completed Mar. 1, 2008; report dated Mar. 19, 2008, 6 pgs.
Written Opinion for International Application No. PCT/US2008/083816, Opinion completed Jan. 10, 2009, dated Jan. 22, 2009, 5 pgs.
Written Opinion for International Application No. PCT/US2009/046588, completed Jul. 14, 2009, dated Jul. 23, 2009, 5 pgs.
Written Opinion of the International Searching Authority for International Application No. PCT/US08/87999, date completed Feb. 7, 2009, dated Mar. 19, 2009, 4 pgs.
Invitation to Pay Add'l Fees Rcvd for International Application PCT/US14/39852, dated Sep. 25, 2 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-DASH) (Release 10), Mar. 2011, 72 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Diagram | Matroska", Dec. 17, 2010, Retrieved from http://web.archive.org/web/201 01217114656/http:I/matroska.org/technical/diagram/index.html on Jan. 29, 2016, Dec. 17, 2010, 5 pgs.
"Draft CR: Trick Mode for HTTP Streaming", 3GPP TSG-SA4 Meeting #58, Apr. 26-30, 2010, Vancouver, Canada, S4-100237, 3 pgs.
"DVD—MPeg differences", printed Jul. 2, 2009 from http://dvd.sourceforge.net/dvdinfo/dvdmpeg.html, 1 page.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6 pgs.
"Information Technology—Coding of audio-visual objects—Part 14: MP4 file format", International Standard, ISO/IEC 14496-14, First Edition, Nov. 15, 2003, 18 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information technology—Generic coding of moving pictures and associated audio information: Systems", International Standard ISO/IEC 13818-1, Second Edition, Dec. 1, 2000, 174 pgs. (presented in two parts).
"Information-Technology—Generic coding of moving pictures and associated audio: Systems, Recommendation H.222.0", International Standard, ISO/IEC 13818-1, Draft 1209, Apr. 25, 1995, 151 pgs.
"Information-Technology—Generic coding of moving pictures and associated audio: Systems, Recommendation H.222.0", International Standard, ISO/IEC 13818-1, Draft 1540, Nov. 13, 1994, 161 pgs.
"Innovation of technology arrived", I-O Data, Nov. 2004, Retrieved from http://www.iodata.com/catalogs/AVLP2DVDLA_Flyer200505.pdf on May 30, 2013, 2 pgs., I-O Data, 2 pgs.
"KISS Players, KISS DP-500", retrieved from http://www.kiss-technology.com/?p=dp500 on May 4, 2007, 1 page.
"Matroska", Wikipedia, Jul. 10, 2017, retrieved from https://en.wikipedia.org/wiki/Matroska on Jul. 20, 2017, 3 pgs.
"Matroska Streaming | Matroska", Retrieved from the Internet: URL:http://web.archive.org/web/201 0121711431 O/http://matroska.org/technical!streaming/index.html [retrieved on Jan. 29, 2016], Dec. 17, 2010, 2 pgs.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pgs.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pgs.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"QCast Tuner for PS2", printed May 11, 2009 from http://web.archive.org/web/20030210120605/www.divx.com/software/detail.php?ie=39, 2 pgs.
"Series H: Audiovisual and Multimedia Systems Infrastructure of audiovisual services—Coding of moving video; High efficiency video coding", International Telecommunication Union, ITU-T H.265, Apr. 2015, 634 pgs. (presented in six parts).
"Smooth Streaming Client", The Official Microsoft IIs Site, Sep. 24, 2010, 4 pgs.
"Specifications | Matroska", Retrieved from the Internet: URL:http://web.archive.org/web/201 00706041303/http:/1www.matroska.org/technical/specs/index.html [retrieved on Jan. 29, 2016, Jul. 6, 2010, 14 pgs.

(56) References Cited

OTHER PUBLICATIONS

"Specifications Matroska", Dec. 17, 2010, [retrieved on Mar. 2, 2018], 12 pgs.
"Supplementary European Search Report for Application No. EP 10834935", International Filing Date Nov. 15, 2010, Search Completed May 27, 2014, 9 pgs.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
U.S. Appl. No. 13/905,804, "Non-Final Office Action Received",
U.S. Appl. No. 13/905,804, "Non-Final Office Action Received", dated Jul. 25, 2014, 15 pgs.
Adams et al, "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Declaration of Patrick McDaniel, Ph.D., Inter Partes Review of U.S. Pat. No. 10,225,588, IPR filed Feb. 15, 2020, 211 pgs.
First Amended Complaint for Patent Infringement, *DivX, LLC* v. *Netflix, Inc.*, No. 2:19-cv-1602-PSG, Am. Compl. (C.D. Cal Aug. 21, 2019), IPR filed Feb. 15, 2020, 229 pgs.
Petition for Inter Partes Review of U.S. Pat. No. 10,225,588, IPR2020-00558, IPR filed Feb. 15, 2020, 96 pgs.
Power of Attorney—Hulu, LLC (IPR2020-00558), IPR filed Feb. 15, 2020, 4 pgs.
Power of Attorney—Netflix, Inc. (IPR2020-00558), IPR filed Feb. 15, 2020, 4 pgs.
Prosecution File History for U.S. Appl. No. 13/340,623 to Kiefer et al. ("Kiefer"), IPR filed Feb. 15, 2020, 1249 pgs (presented in 6 parts).
Prosecution File History for U.S. Pat. No. 10,225,588, IPR filed Feb. 15, 2020, 2937 pgs (presented in 29 parts).
U.S. Appl. No. 61/530,305, filed Sep. 1, 2011, 6 pgs.
ISO/IEC 14496-12 Information Technology—Coding of Audio-Visual Objects Part 12: ISO Base Media File Format, Oct. 2008.
Server-Side Stream Repackaging (Streaming Video Technologies Panorama, part 2) (Jul. 2011), 10 pgs.
Declaration of Patrick McDaniel, Ph.D., Inter Partes Review of U.S. Pat. No. 9,184,920, Case No. IPR2020-00511, IPR filed Feb. 6, 2020, 168 pgs.
Defendant Netflix, Inc.'s Invalidity Contentions for U.S. Pat. No. 7,295,673; 8,139,651; 8,472,792; 9,270,720; 9,998,515; 10,212,486; 10,225,588; 9,184,920, *DIVX, LLC* v. *Netflix, Inc.* , Case No. 2:19-cv-1602-PSG-DFM, C.D. Cal., Apr. 2, 2020, 148 pgs.
Dynamic Adaptive Streaming over HTTP—Standards and Design Principles (Feb. 2011), 10 pgs.
Information Technology—MPEG Systems Technologies — Part 6 Dynamic Adaptive Streaming Over HTTP (DASH) (Oct. 2010), 10 pgs.
Information Technology—MPEG Systems Technologies—Part 7: Common Encryption in ISO Base Media File Format Files (ISO/IEC 23001-7), Apr. 2015, 24 pgs.
ISO/IEC FCD 23001-6 MPEG systems technologies Part 6: Dynamic adaptive streaming over HTTP (DASH), Jan. 28, 2011, 86 pgs.
MPEG-DASH presentation at Streaming Media West 2011, Nov. 2011, 14 pgs.
Petition for Inter Partes Review of U.S. Pat. No. 9,184,920, IPR2020-00511, IPR filed Feb. 6, 2020, 89 pgs.
Power of Attorney—Netflix, Inc. (IPR2020-00511), IPR filed Feb. 6, 2020, 3 pgs.
Prosecution File History for U.S. Pat. No. 9,184,920, IPR filed Feb. 6, 2020, presented in 24 parts.
Universal Mobile Telecommunications Systems (UMTS); ETSI TS 126 244 V9.4.0 (May 2011) 3GPP TS 26.244 version 9.4.0 Release 9, 58 pgs.
"Apple HTP Live Streaming specification", Aug. 2017, 60 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"The MPEG-DASH Standard for Multimedia Streaming Over the Internet", IEEE MultiMedia, vol. 18, No. 4, 2011, 7 pgs.
Abomhara et al. "Enhancing Selective Encryption for H.264/AVC Using Advanced Encryption Standard", International Journal of computer Theory and Engineering, Apr. 2010, vol. 2, No. 2, pp. 223-229.
Antoniou et al. "Adaptive Methods for the Transmission of Video Streams in Wireless Networks", 2015, 50 pgs.
Apostolopoulos et al. "Secure Media Streaming and Secure Transcoding", Multimedia Security Technologies for Digital Rights Management, 2006, 33 pgs.
Beker et al. "Cipher Systems, the Protection of Communications", 1982, 40 pgs.
Bocharov et al, Microsoft, Portable Encoding of Audio-Video Objects: The Protected Interoperable File Format (PIFF) (Sep. 2009), 10 pgs.
Chaddha et al. "A Frame-work for Live Multicast of Video Streams over the Internet", Proceedings of 3rd IEEE International Conference on Image Processing, Sep. 19, 1996, Lausanne, Switzerland, 4 pgs.
Cheng, Partial Encryption for Image and Video Communication (Fall 1998), 10 pgs.
Cheng et al. "Partial encryption of compressed images and videos", IEEE Transactions on Signal Processing, vol. 48, No. 8, Aug. 2000, 33 pgs.
Cheung et al. "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, an Approach for Next Generation Mobile Technologies", Thesis, 2010, 84 pgs.
Fielding et al. "Hypertext Transfer Protocol—HTTP1.1", Network Working Group, RFC 2616, Jun. 1999, 114 pgs.
Kim et al. "Tree-Based Group Key Agreement", Feb. 2004, 37 pgs.

(56) References Cited

OTHER PUBLICATIONS

Laukens, "Adaptive Streaming—A Brief Tutorial", EBU Technical Review, 2011, 6 pgs.
Li et al. "Layered Video Multicast with Retransmission (LVMR): Evaluation of Hierarchical Rate Control", Proceedings of IEEE INFOCOM'98, The Conference on Computer Communications. Seventeenth Annual Joint Conference of the IEEE Computer and Communications Societies. Gateway to the 21st Century, Cat. No. 98, vol. 3, 1998, 26 pgs.
Massoudi et al. "Overview on Selective Encryption of Image and Video: Challenges and Perspectives", EURASIP Journal on Information Security, Nov. 2008, 18 pgs.
McCanne et al. "Receiver-driven Layered Multicast", Conference proceedings on Applications, technologies, architectures, and protocols for computer communications, Aug. 1996, 14 pgs.
Timmerer et al. "HTTP Streaming of MPEG Media", Proceedings of Streaming Day, 2010, 10 pgs.
Trappe et al., "Key Management and Distribution for Secure Multimedia Multicast", IEEE Transaction on Multimedia, vol. 5, No. 4, Dec. 2003, pp. 544-557.
Decision Granting Institution of Inter Partes Review 35 U.S.C. § 314, IPR2020-00558, U.S. Pat. No. 10,225,588, 46 pgs.

* cited by examiner

FEDERATED DIGITAL RIGHTS MANAGEMENT SCHEME INCLUDING TRUSTED SYSTEMS

CROSS REFERENCE TO RELATED APPLICATIONS

This application is a continuation of U.S. patent application Ser. No. 14/928,746 filed Oct. 30, 2015, which is a continuation of U.S. patent application Ser. No. 14/183,360 filed Feb. 18, 2014 and issued Nov. 10, 2015 as U.S. Pat. No. 9,184,920, which is a continuation of U.S. patent application Ser. No. 13/489,409 filed Jun. 5, 2012 and issued Feb. 18, 2014 as U.S. Pat. No. 8,656,183, which is a continuation of U.S. patent application Ser. No. 12/411,271 filed Mar. 25, 2009 and issued Jun. 12, 2012 as U.S. Pat. No. 8,201,264, which is a continuation of U.S. patent application Ser. No. 11/685,929 filed Mar. 14, 2007 and issued Apr. 7, 2009 as U.S. Pat. No. 7,515,710, which claims priority to U.S. Provisional Application No. 60/782,215 filed Mar. 14, 2006, the disclosures of which are fully incorporated herein by reference.

FIELD OF THE INVENTION

The present invention relates generally to digital rights management schemes and more specifically to playback certification schemes where various playback activities are enabled in a coordinated fashion by different entities within the system.

Providers of multimedia content can digitize content for distribution via digital communication networks. An important issue faced by a content distribution system is enabling only those customers that have purchased the content to play the content and compartmentalize access to all the stakeholders in the content distribution chain. One approach is to encrypt portions of the content and to issue encryption keys to authorized users that enable encrypted portions of the content to be unencrypted. Layers of keys and protection policies can be used so a single encryption key alone is insufficient for the user to access the content. In a number of systems, users purchase players that possess specified decryption capabilities. Content providers can distribute content to user's owning such a player in an encryption format supported by the player. Complying with a specified protection policy typically involves using an encryption key specified by the manufacturer of the players. In many instances the manufacturer of the players will not reveal the encryption keys used in the specified encryption scheme and likewise the content provider does not want to share the content keys to the manufacturer of the players.

SUMMARY OF THE INVENTION

Systems and methods are described for issuing content to devices possessing various playback, decryption and communication capabilities. In a number of embodiments, the variation in the capabilities of devices are supported by providing processes for registering a device to receive content, playing back content on a device and revoking a device's registration that differ in response to the capabilities of different classes of device. Many embodiments of the invention include a single entity for registering devices. The registration entity is configured to register each different class of device. In several embodiments, the registration entity also distributes trusted systems to content providers. The trusted systems enable content providers to issue content with playback certificates. The playback certificates determine the playback capabilities that specific users have with respect to the content and can include at least one piece of information encrypted using an encryption key known only to the content provider. An aspect of many embodiments of the invention is the ability of content providers to issue playback certifications without needing to exchange information with a central registration service.

In many embodiments of the invention there is a central registration device and multiple distributed content services. As part of the registration process, there is a one time sharing of data between the registration service and the content services. In addition, content services can issue secure transactions without needing to contact the central registration service.

One embodiment of the invention includes a registration server connected to a network, a content server connected to the network and to a trusted system, a first device including a non-volatile memory that is connected to the network, and a second device including a non-volatile memory that is connected to the network. In addition, the registration server is configured to provide the first device with a first set of activation information in a first format, the first device is configured to store the first set of activation information in non-volatile memory, the registration server is configured to provide the second device with a second set of activation information in a second format, and the second device is configured to store the second set of activation information in non-volatile memory.

In a further embodiment of the invention, the first and second devices are configured to request content from the content server, the content server is configured to issue technically protected content including multiple playback certifications, and the first device is configured to use the first set of activation information and one of the playback certifications to access the technically protected content.

In another embodiment of the invention, the second device is configured to use the second set of activation information and another of the playback certifications to access the technically protected content.

In a still further embodiment, the first set of activation information is protected by a base encryption key and includes a user encryption key and a random value, the playback certification includes information encrypted using the base encryption key, and the playback certification includes information encrypted using the user encryption key.

In still another embodiment, the information encrypted using the base encryption key and the user encryption key enables playback of the technically protected content.

In a yet further embodiment, the second set of activation information includes the same base encryption key and a different user encryption key.

In yet another embodiment, the second set of activation information includes a different base encryption key and a different user encryption key.

In a further embodiment again, the content server is configured to provide a set of content encryption keys and information concerning the device requesting content to the trusted system, and the trusted system is configured to generate the multiple playback certifications.

In another embodiment again, the registration server is configured to revoke the base encryption key.

In a further additional embodiment, the registration server is configured to revoke the user encryption key.

Another additional embodiment includes, a processor, a storage device connected to the processor, and a network interface device connected to the processor and configured to connect to a network. In addition, the processor is configured to receive registration requests via the network interface device, the processor is configured to generate activation information for transmission via the network interface device, the processor is configured to receive activation confirmations via the network interface device, and the processor is configured to record the completed activation of the device in the storage device.

In a still yet further embodiment, the activation information includes a base encryption key and a user encryption key.

In another still yet further embodiment, the processor is configured to scramble at least some of the activation information.

In a still further embodiment again, the processor is configured to generate multiple base encryption keys and multiple user encryption keys, the activation information includes the multiple base encryption keys and a single user encryption key and information concerning an active base encryption key, the processor is configured to store the multiple base encryption keys and the multiple user encryption keys in the storage device, and the processor is configured to store information indicative of the active base encryption key and the user encryption key included in the activation information in the storage device.

In still another embodiment again, the processor is configured to authenticate the activation confirmation using the activation information.

A still further additional embodiment includes, a processor, a storage device connected to the processor and including stored content, a trusted and opaque system connected to the processor, and a network interface device connected to the processor and configured to be connected to a network. In addition, the processor is configured to receive requests to provide the stored content via the network interface device, the processor is configured to generate encryption keys and encrypt the stored content, the processor is configured to provide information indicative of the request and the encryption keys to the trusted system, the trusted system is configured to provide a playback certification containing at least one encrypted copy of the encryption keys used to encrypt the stored content, and the processor is configured to transmit the encrypted content and the playback certification via the network interface device.

In a yet further embodiment again, the playback certification includes multiple copies of at least one of the encryption keys and each copy is encrypted using a different encryption key.

In yet another embodiment again, the trusted system is configured to provide multiple playback certifications, each playback certification includes at least one encrypted copy of the encryption keys, and each playback certification is formatted differently.

A yet further additional embodiment includes a processor housed within a tamper proof housing, and a communication interface connected to the processor. In addition, the processor is configured to receive requests to generate playback certifications, and each request includes at least one content encryption key and information identifying a user, the trusted system is configured to encrypt the content encryption key using an encryption key associated with the user, and the processor is configured to transmit the playback certification via the communication interface.

In yet another additional embodiment, the processor is configured to generate multiple playback certifications, each playback certification includes information encrypted using a different base encryption key, and each playback certification is formatted differently.

A further additional embodiment again includes a processor, a network interface device connected to the processor and configured to be connected to a network, and a non-volatile memory connected to the processor. In addition, the processor is configured to transmit a registration request via the network interface device, the processor is configured to receive an activation record via the network interface device, the processor is configured to extract activation information from the activation record, the processor is configured to generate an activation confirmation using the activation information, the processor is configured to transmit the activation confirmation via the network interface device, and the processor is configured to store at least some of the activation information in the non-volatile memory.

In another additional embodiment again, the activation information includes a base encryption key and a user encryption key.

In another further embodiment, the activation information includes multiple base encryption keys.

In still another further embodiment, the activation information is scrambled, and the processor is configured to perform processes to descramble the activation information.

An embodiment of the method of the invention includes sending a registration request including identifying information, receiving an activation record, extracting activation information from the activation record, generating an activation confirmation from the extracted activation information, and sending the activation confirmation.

In a further embodiment of the method of the invention, sending a registration request including identification information further includes transmitting the telephone number of a mobile phone to a registration server.

In another embodiment of the method of the invention, extracting activation information from an activation record further includes decrypting information within the activation record and descrambling decrypted information in accordance with a predetermined sequence of processes.

In a still further embodiment of the method of the invention, the activation information includes a base encryption key and a user encryption key and a random value.

In still another embodiment of the method of the invention, the activation information includes multiple base encryption keys.

A yet further embodiment of the method of the invention includes receiving a content key from content provider, receiving playback parameters from a content provider, locating a user key and a base key associated with a device, encrypting the playback parameters using the base key, encrypting the content key using the user key, and providing a playback certification including the encrypted playback parameters and the encrypted content key.

Yet another embodiment of the method of the invention also includes locating multiple user keys and multiple base keys associated with a device, forming a playback parameters table, where each entry in the table includes the playback parameters encrypted using a different base key, forming a content key table, where each entry in the table includes a copy of the content key encrypted using a different user key and providing a playback certification including the playback parameters table and the content key table.

A further embodiment again of the method of the invention includes generating a deregistration request using activation information known to a server and a device, transmitting the deregistration request to the server, and receiving acknowledgement of the deregistration request.

Another embodiment again of the method of the invention includes generating multiple domain keys associated with a particular class of device, providing each of the domain keys to each device in the class of device, storing the multiple domain keys on a registration server, using each of the multiple domain keys to encrypt information to generate a playback certification, which enables each device in the class of device to access technically protected content, deleting one of the stored multiple domain keys, and using the remaining multiple domain keys to encrypt information to generate a playback certification.

A further additional embodiment of the invention includes generating multiple user keys associated with a particular device, storing the multiple user keys on a registration server, providing one of the user keys to the device, using each of the multiple user keys to encrypt information to generate a playback certification, which enables the device to access technically protected content, deleting one of the stored user keys, providing another of the user keys to the device, and using each of the remaining multiple user keys to encrypt information to generate a playback certification.

DETAILED DESCRIPTION OF THE INVENTION

Figure 1:
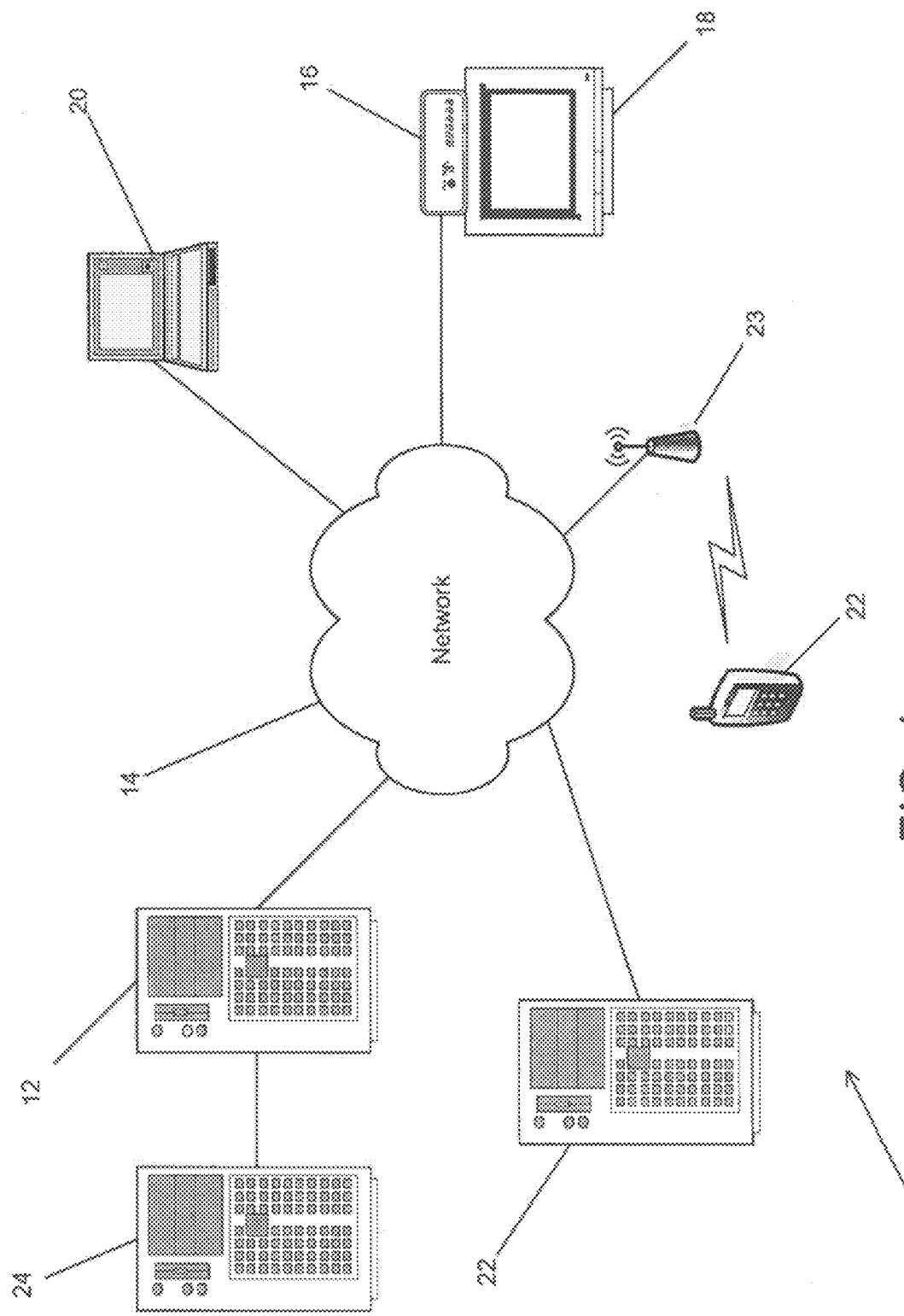
FIG. 1 is a schematic diagram showing a federated system in accordance with an embodiment of the invention.

Turning now to the drawings, a federated system for establishing playback parameters for digital content that includes trusted systems is illustrated. Playback parameters define the actions that a playback device is able to perform with respect to a particular piece of digital content. Playback parameters can govern the playing, copying and/or distribution of the content. The system is referred to as federated, because no single system possesses all of the information required to set the playback parameters for a piece of content. In a number of embodiments, content providers can use trusted systems which contain secrets the content providers cannot access to issue playback certifications. The playback certifications that can be used to provide technical protection to digital content such as audio/video presentations, data, games, documents and programs. In many embodiments, the playback certifications dictate how the content can be viewed, edited and/or otherwise accessed by authorized users using authorized equipment. In many instances, the playback certifications can prevent users from removing commercials from an audio/video presentation. In addition, the technical protection incorporated in the playback certifications enables the creation of content distribution systems in accordance with the present invention that are resistant to spoofing and other attempted fraudulent activity. Where multiple classes of devices are supported by a federated system, a single piece of content can be issued with multiple playback certifications. Each of the playback certifications can be customized to a particular class of devices and govern the manner in which that class of device can playback the content.

In several embodiments, the federated system includes a registration system that registers playback devices. The registration process involves establishing one or more "user encryption keys" that are known only to the playback device and the registration entity. The "user encryption keys" can be unique to a device or user or the same encryption keys can be placed in a limited set of devices. Once registered, a playback device can request content from a content provider within the federated system. The content provider can encrypt the content using one or more encryption keys that are only known to the content provider. The content provider then provides the encryption keys used to encrypt the content to a trusted system provided by the registration entity. The trusted system then encrypts copies of the content provider's encryption keys using one or more of a user's "user encryption keys". In many embodiments, the trusted system encrypts additional information using one or more base keys that can be known by all playback devices, a predetermined class of playback devices or specified groups of playback devices depending upon the structure of the federated system. In instances where a base key is issued with respect to a particular class of devices or a domain, the base key can be referred to as a domain key.

Although many of the embodiments described herein refer to combinations of encryption keys such as base keys, content keys, user keys and frame keys, any of a variety of combinations of keys provided by different entities can be used in a federated system in accordance with embodiments of the invention. In addition, no single technique need be used to register playback devices, provide playback devices with playback certifications and suspend playback devices. Federated systems in accordance with a number of embodiments of the invention provide a single registration entity capable of performing discrete processes for registering and suspending a variety of classes of devices, where each process utilizes the capabilities of each class of device.

An embodiment of a federated system 10 is shown in FIG. 1. The system includes a content server 12 that is connected to a number of playback devices by a network 14. In the illustrated embodiment, three playback devices are shown. The first is a consumer electronics device 16 that is connected to a rendering device 18 such as a television. The second playback device is a computer 20 that is appropriately configured using software. The third is a mobile phone handset 22 that is connected to the network 14 via a wireless link 23. Other devices that can render audio and/or video can also be playback devices in accordance with embodiments of the present invention.

Additional elements of the federated system 10 are a registration server 26 and a trusted system 28. The registration server 26 is connected to the network. Although the trusted system 24 is shown as being directly connected to the content server 12, trusted systems can also be connected to the network and shared by a number of content servers.

In the illustrated embodiment, the registration server 26 can be used to register playback devices within the federated system. A playback device can register to participate within the federated system directly with the registration server or indirectly, for example via a content server that completes the registration by forwarding the registration information to the registration server. Once registered, the playback devices can request content from the content server 12. The content server 12 can provide the playback device with encrypted content that includes one or more playback certifications depending upon the number of classes of devices and/or the versions of playback certifications supported by legacy devices within the federated system. In several embodiments, the playback device uses one or more user encryption keys that the registration server associated with the playback device during registration, one or more base keys inherent to a class of devices and the playback certification to access the content. In a number of embodiments, the content server 12 does not possess, in the clear (i.e., in an unencrypted form), the encryption keys used to encrypt the content. The trusted system 24 does, however, possess the ability to obtain the encryption keys in the clear. Therefore, the content server 12 can provide information requiring encryption to the trusted system 24 for encryption and the trusted system 24 can generate any required playback certifications using the playback device's encryption keys (if required).

As discussed above, playback devices in accordance with the present invention can take a number of different forms. Playback devices can be consumer electronics devices, including stand-alone devices or networked devices that are connected via copper cable, fiber optic cable, wireless connection or other networking technologies. In addition, playback devices can be software that executes on general purpose network computers, such as PCs, servers, workstations and embedded systems. Furthermore, playback devices can take the form of digital electronics cards or printed circuit boards. Moreover, all of the functionality of a playback device can be implemented in an application specific integrated circuit, a field programmable gate array, firmware, software or other electronic device.

The trusted system 24 is essentially a black box that responds to instructions in known ways without revealing any information about the processes it is performing. In a number of embodiments, the trusted systems are opaque in the sense that the base key(s) are stored inside the trusted system and the process of generating a playback certification cannot be ascertained by observation of the trusted system. Trusted systems can be implemented in a number of ways. Several embodiments of trusted systems are implemented using secure software that is tamper resistant. Such software includes software that employs code obfuscation, self modifying code, encrypted code segments, anti-debugging, code integrity, hardware monitoring, split-keys, and/or kernel/driver authentication. In many embodiments, secure hardware is used to implement trusted systems. Examples of secure hardware include programmable hardware security modules such as those that comply with the Federal Information Processing Standard (FIPS) Publication 140-2 specified by the U.S. National Institute of Standards and Technology and the Communications Security Establishment of the Government of Canada, trusted computing hardware or other types of hardware that are tamper resistant. Examples of such hardware include hardware securely encased in such a way that the hardware is rendered inoperable and/or important information is erased from memory in the event that the encasing is opened. In many embodiments, trusted systems use system-level security including firewalls, network and host-based intrusion detection, system hardening, two-form authentication, physical security (such as secure data centers, security cameras, locked computer racks, physical access control, access logs, etc.) and cascaded network architectures.

An important element of the federated systems described above is the ability to trust in the security of the trusted systems. In many embodiments, the trusted systems are commissioned by the registration entity. The commissioning process typically involves configuring the trusted system and providing the trusted system with information concerning the functions that the trusted system is authorized to perform. For example, a trusted system may be authorized to register playback devices, generate persistent, user-bound playback certifications but may prohibit the generation of base or general playback certifications. Configuration is typically performed by providing an appropriately formatted message to the trusted system.

In many embodiments, the trusted systems generate an audit log of all transactions/operations performed by the secure system. Each entry in the log can be numbered in a monotonically increasing sequence and the log signed using a private key enabling the detection of attempts to alter or remove entries on a log. Content providers can use the log to help detect fraudulent activity. For example, if the number of playback certifications that have been generated exceeds the number that were sold, then it is possible that someone has broken into the content provider's customer database, stolen content and/or user encryption keys and has been using the trusted system to generate unauthorized playback certifications. In addition, the security of the trusted system can be further increased by using different base keys for different device domains and including multiple redundant base keys per device. These measures enable key retirement, revocation and rotation.

In many embodiments, the entity that commissions the trusted systems (typically the entity that registers devices) can exercise limited control over use of a trusted system. In several embodiments, the trusted system can be configured to automatically expire if not updated periodically. Such updates can be used to change the trusted system's entitlements including performing key revocation and redundant key rotations.

Figure 2:
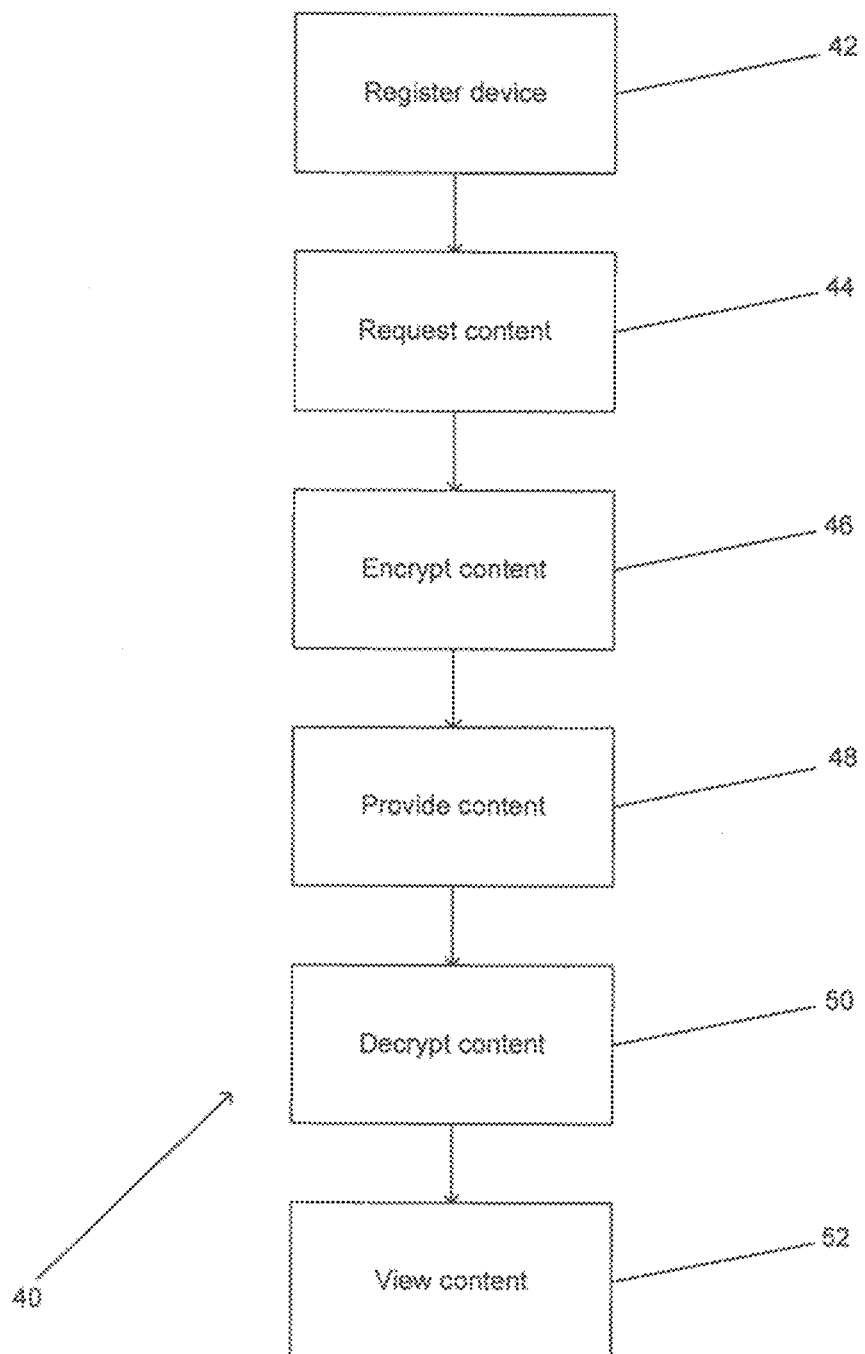
FIG. 2 is a flow chart showing a process for viewing a specific piece of content in accordance with an embodiment of the invention.

A process in accordance with the present invention for obtaining content is shown in FIG. 2. The process 40 includes registering (42) a playback device. Following registration, the playback device can request (44) content. Prior to the content being provided (48) to the playback device, the content is encrypted. The actual content encryption can be done offline, but the final protection for the keys is typically done at the time the content is requested. Upon receipt of the content by the playback device, the content is decrypted (50) and the content is then available for viewing (52).

As discussed above the registration of a playback device involves the playback device being registered with a registration server. In many embodiments, the user device is provided with one or more "user_ids" (i.e., a user identification) and one or more unique "user encryption keys". Processes for registering playback devices, such as consumer electronics devices, are described in U.S. patent application Ser. No. 10/895,355 filed Jul. 21, 2004 and entitled Optimized Secure Media Playback Control. The disclosure of U.S. patent application Ser. No. 10/895,355 is incorporated herein by reference in its entirety.

Figure 2A:
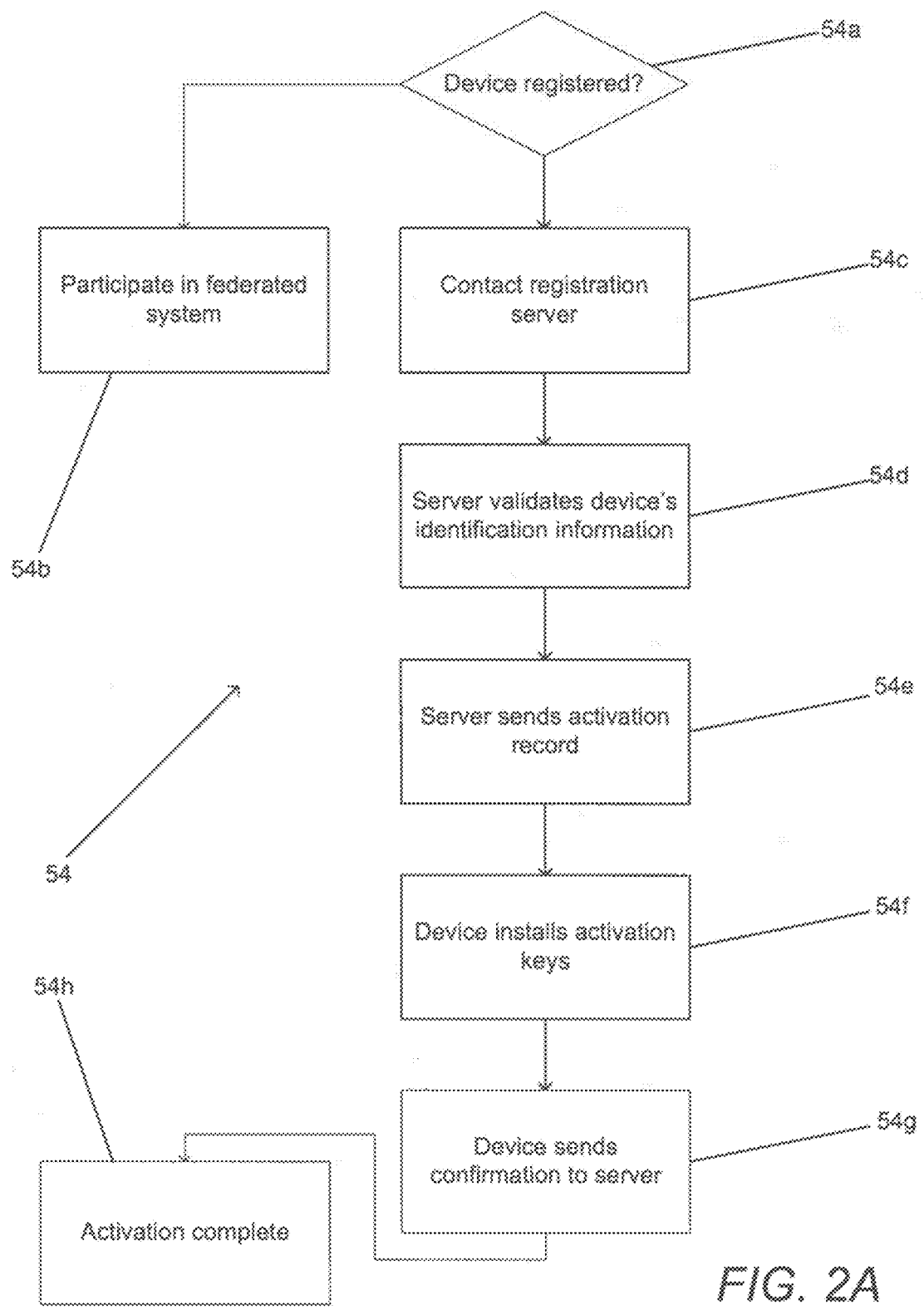
FIG. 2A is a flow chart showing a process for registering a device capable of communicating with a registration server.

Extending on the Optimized Secure Media Playback Control registration process described in U.S. patent application Ser. No. 10/895,355 is a registration process that can be used to register devices capable of interactive communication with a registration server, such as mobile phones, is shown in FIG. 2A. The process 54 includes determining (54*a*) whether the device has been "activated". In many embodiments, this determination involves determining whether the device includes has processed an activation record that has been provided by the server. The activation record includes information concerning the active "user_id" and "user encryption key" of the device and the active "base key" that has been assigned to the class of devices to which the device belongs. The activation record can be scrambled and encrypted using public key/private key encryption assigned to the device by the registration service and placed in the device during manufacturing. If the activation record has been processed, then the device can participate (54*b*) in the federated system, because it will have the user id and user encryption key and be considered activated, also known as "registered".

When the device has not been activated, the device contacts (54*c*) the registration server to commence registration. The device provides information including identifying information such as a phone number or a user name and password to the registration server. The server validates (54*d*) the identifying information and sends (54*e*) an activation record to the device. The device performs the necessary decryption and/or descrambling processes required to obtain the various activation keys and install (54*f*) them. Once the installation is complete, the device sends (54*g*) an activation confirmation code to the server and the server authenticates (54*h*) the activation code to complete the activation. Although the process shown in FIG. 2A contemplates direct communication between the device and the registration server. The initial communication can occur between a third device such as a networked computer and the registration server. Once the registration is initiated using the networked computer, the registration server can send the activation record to either the computer or the device. If the activation record is sent to the computer, the activation record can then be transferred to the device and used to complete the activation of the device. The activation of the device can be completed by the user entering the human readable codes into a user interface for the registration service.

Figure 3:
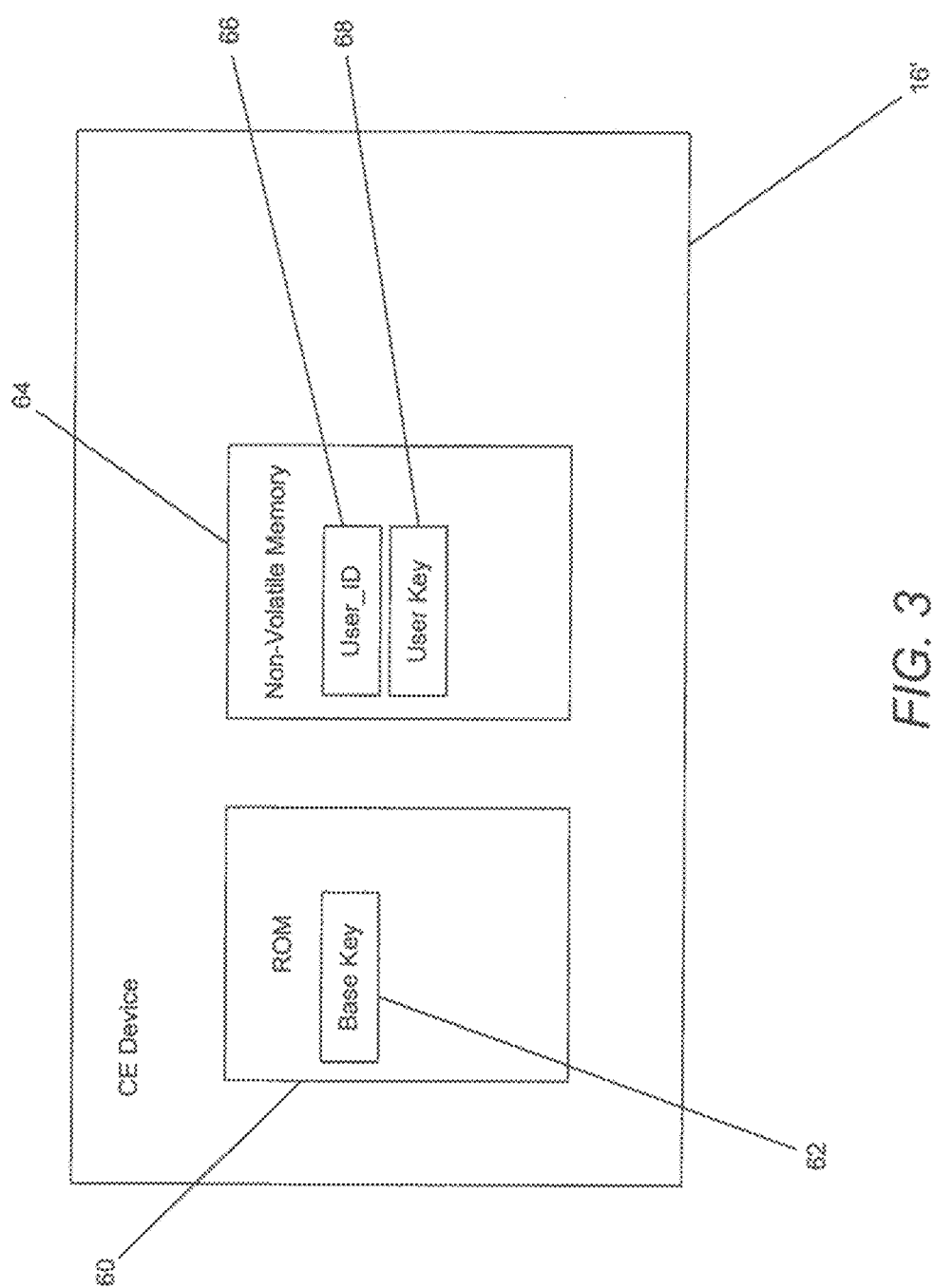
FIG. 3 is a schematic diagram of a consumer electronics device including ROM and non-volatile memory in accordance with an embodiment of the invention.

A registered consumer electronics device in accordance with an embodiment of the present invention is shown in FIG. 3. The registered consumer electronics device 16' includes ROM 60 that contains a "base encryption key" 62. The "base encryption key" 62 is an encryption key that enables the playback device to be registered within the federated system. In addition to the ROM 60, the consumer electronics device includes a non-volatile memory 64 in which one or more "user_ids" 66 and one or more "user encryption keys" 68 are stored. As discussed above, the "user_id(s)" 66 and "user encryption key(s)" 68 are obtained from a registration server in many embodiments of the present invention.

Although the consumer electronics device shown in FIG. 3 only shows a single "base encryption key" 62 in its ROM, multiple base encryption keys that are each identifiable using a unique identifier can be stored in the ROM. In addition, the encryption keys need not necessarily be stored in the clear. Additional encryption keys and/or scrambling processes can be provided within a playback device that can be used to decrypt the keys for use.

In many embodiments, playback devices support multiple device registrations (i.e., registered to multiple users at a time). In systems where a user has a limit on the number of devices that can be registered, then each user's registration of the device counts against that user's device limit.

Figure 4:
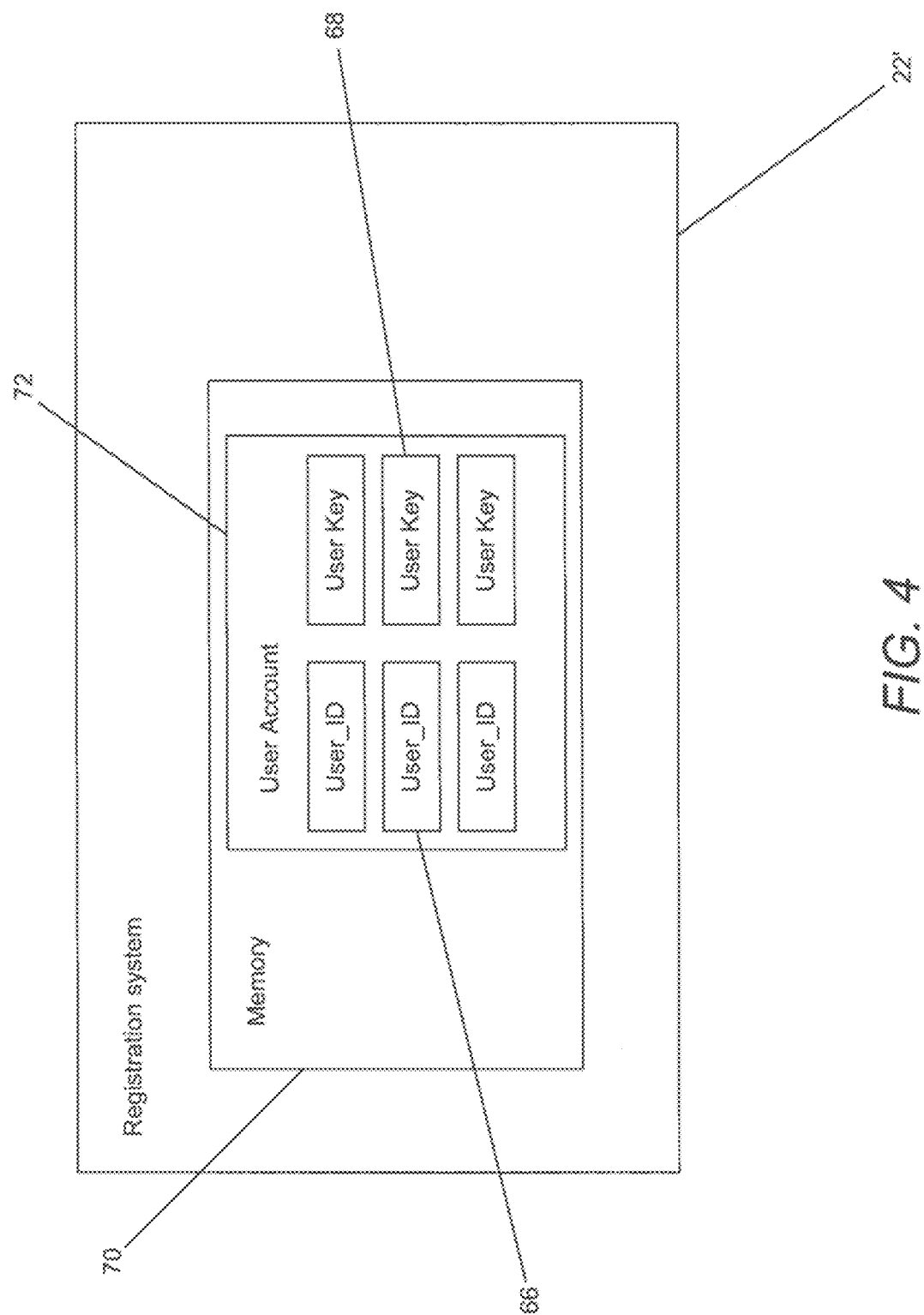
FIG. 4 is a schematic diagram of a registration server in accordance with an embodiment of the invention.

When a registered playback device, similar to the playback device shown in FIG. 3 is registered, the registration server creates a user account containing information about the registered device. A registration server in accordance with an embodiment of the present invention is shown in FIG. 4. The registration server 22' includes a memory in which user accounts 72 are stored. In many embodiments, the user accounts contain the "user_id(s)" 66 and "user encryption key(s)" for a registered device. When a user account includes multiple encryption keys, each "user encryption keys" can be identified using a "user_key_id" that is also stored in the user account. In a number of embodiments, the registration server maintains additional information concerning a user such as other devices registered by the user. In many embodiments, the user can define groups of devices between which the user desires the ability to share content. For example, the user can define a "premium group", a "syndication group" and a "general group". Each group can give a different number of device registrations (e.g., "premium group" could include up to 3 devices while "general group" could give up to 10 devices). In embodiments where groups are supported, the registration server can issue a bit vector to a device requesting registration that indicates the groups to which the device belongs. The bit vector can enable content providers to issue playback certifications that enable content to be played on a group of devices or on specific devices only.

Although the above discussion refers to the registration server as a separate device, the registration server can be combined with other devices. In many embodiments, a trusted system also performs the functions of a registration server.

When a device is registered, the device is then able to request content from a content provider. In federated systems in accordance with a number of embodiments of the invention where only one class of device exists, the content server can issue encrypted content to a user with a single playback certification. In other embodiments that support multiple classes of devices, then the content server can issue encrypted content to a user with multiple playback certifications. Each playback certification contains the information required by a particular class of devices to play back the content. In this way, the playback requirements of different classes of device can be accommodated.

Figure 5:
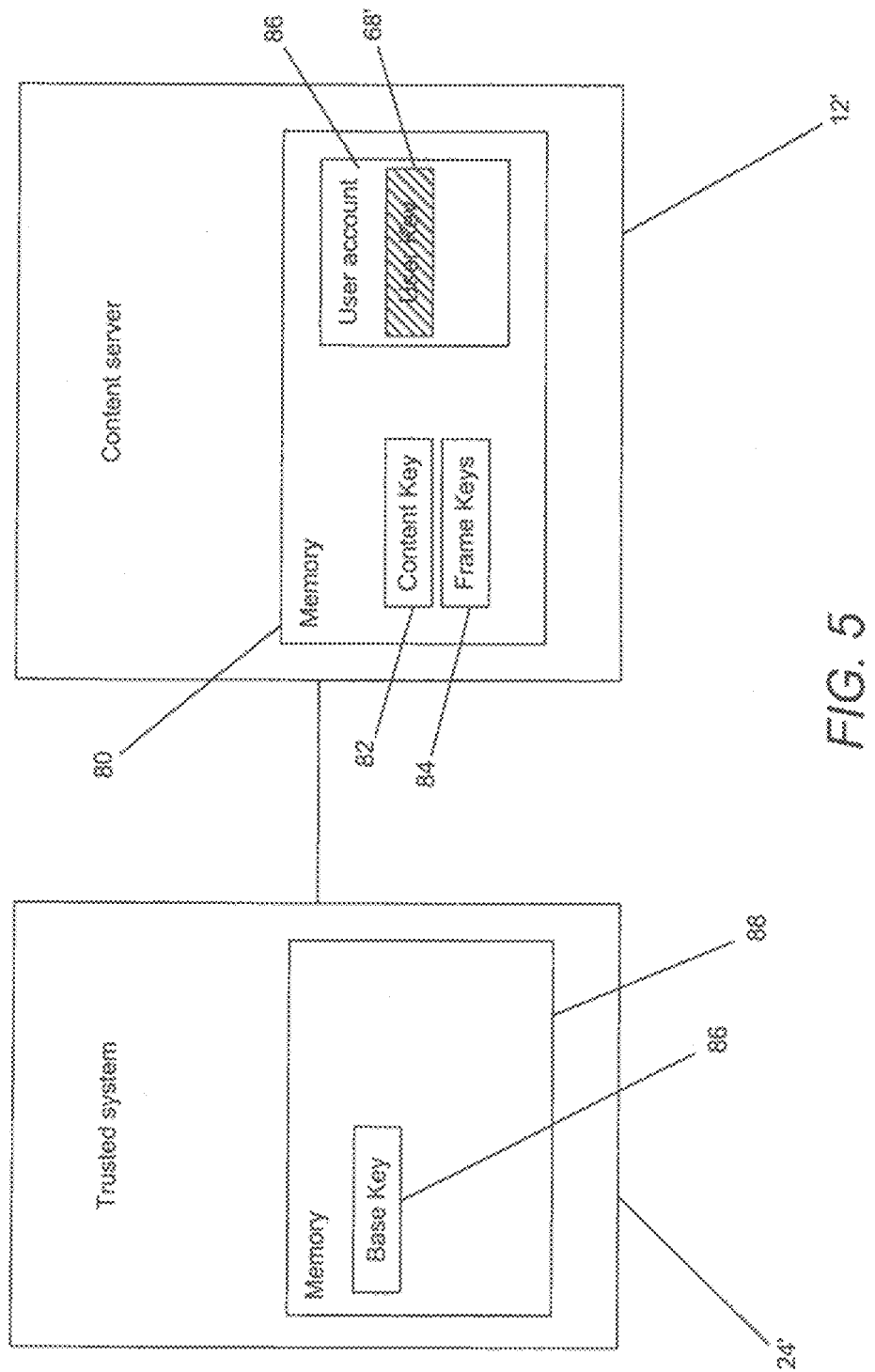
FIG. 5 is a schematic diagram of a content distribution system connected to a trusted system in accordance with an embodiment of the invention.

An embodiment of a content server connected to a trusted system in accordance with an embodiment of the present invention is shown in FIG. 5. The content server 12' includes memory 80 that contains a "content encryption key" and "frame encryption keys". The memory 80 also includes a user account 86 that stores information about the user requesting the content. In a number of embodiments the user account contains an encrypted form of one or more "user encryption keys" 68'. In the illustrated embodiment, the memory 80 contains a "content encryption key" 82 and a table of "frame encryption keys" 84.

The table of "frame encryption keys" 84 can be used to encrypt frames of a video sequence. Processes for encrypting video sequences using frame encryption keys are discussed in U.S. patent application Ser. No. 10/615,898 filed Jul. 8, 2003 and entitled "Method and System for Securing Compressed Digital Video". The disclosure of U.S. patent application Ser. No. 10/615,898 is incorporated herein by reference in its entirety.

The "content encryption key" 82 and the "frame encryption keys" 84 are generated by the content provider. These keys are provided to the trusted system as part of the generation of the playback certification. In many embodiments, maintaining the "content encryption key" 82 and the "frame encryption keys" 84 within the content provider's system is desirable to limit the potential for the keys to become publicly known. In other embodiments having lower security concerns, the content provider can provide the "content encryption key" 82 and the "frame encryption keys" 84 to another entity to perform the encryption of the content. In a number of embodiments, the content provider provides a video sequence for encryption to the trusted system and the trusted system returns the encrypted content. In several embodiments, the content provider provides the content to a 3rd party system that encrypts the content using any suitable content encryption technique and returns the encrypted content to the content provider.

In the illustrated embodiment, the content server 12' includes user accounts 86 and the user accounts contain encrypted "user encryption keys" 68'. An advantage of maintaining the user account at the content server is that no communication with devices outside of the content provider's system is required to issue content. Where communication with other devices is acceptable, the encrypted "user encryption keys" 68' can be provided by the playback device and the encrypted "user encryption key" 68' encrypted using either the "base encryption keys" or other encryption keys. In other embodiments, the content server 12' requests that the registration server provide the encrypted "user encryption keys" 68' and the encrypted "user encryption keys" 68' are encrypted using the "base encryption keys" or other encryption keys.

In the illustrated embodiment, the trusted system 24' also includes a memory 86 that contains a set of keys that the trusted system 24' can use to issue playback certifications. These keys includes the active base key(s) 86 that are used by various classes of device. The set of keys can also include inactive base keys in anticipation of key retirements. As discussed above, the content server 12' does not see in the clear encryption keys used by the trusted system 24' to generate playback certifications.

The keys possessed by the content server and the trusted system can be used to encrypt content for distribution to a user. The content can be a video sequence, an audio sequence, a still photograph or a file. In embodiments, where content other than a video sequence is encrypted the keys described as the "frame encryption keys" are used to encrypt at least a portion of the content.

Figure 6:
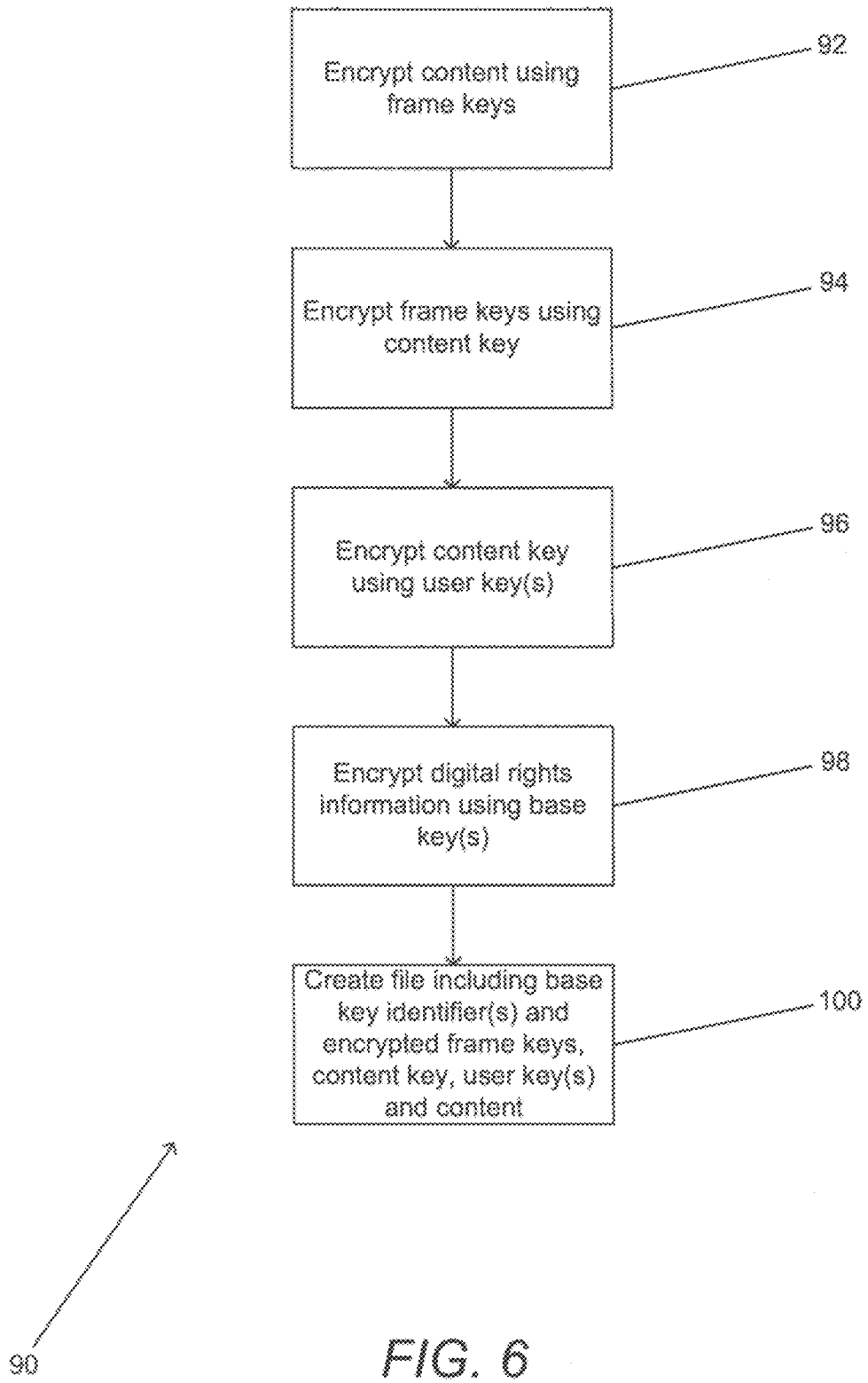
FIG. 6 is a flow diagram showing a process for encrypting content in accordance with an embodiment of the invention.

A process in accordance with the present invention for encrypting content and generating a playback certification is shown in FIG. 6. The process 90 includes encrypting (92) the content using "frame encryption keys". The "frame encryption keys" are then encrypted (94) using the "content encryption keys". The "content encryption key" is then encrypted (96) using the one or more "user encryption key(s)", which enables for "user encryption key" revocation or retirement (see discussion below) and then digital rights specified with respect to the content by the content provider are then encrypted (98) using one or more "base encryption keys" appropriate to the class of device for which the playback certification is being issued. Again, the use of multiple "base encryption keys" allows for "base encryption key" revocation or retirement (see discussion below). The resulting bundle of variously encrypted pieces of information are used to create the playback certification. The playback certification is incorporated (100) with the encrypted content to create a file for distribution to the user that requested the content. In embodiments where more than one base key is used, a base key identifier is also included in the file. In embodiments where multiple playback certifications are provided, each playback certification can include information identifying the type of playback certification, such as a version number.

As discussed above, the distribution of the various encryption keys throughout the system varies. In many embodiments, the content, the rights granted and the "user_id" are provided to a trusted system and the trusted system returns an encrypted file including a playback certification for distribution to a user. In other embodiments, the content provider sends the secure system simply the information requiring encryption by the one or more "user encryption keys" and one or more "base encryption keys". In other embodiments, other combinations of keys provided by different entities are used to secure information necessary to access technically protected content. As discussed above, the technique used to technically protect the content can vary depending upon the security needs of entities within the federated system.

Figure 7:
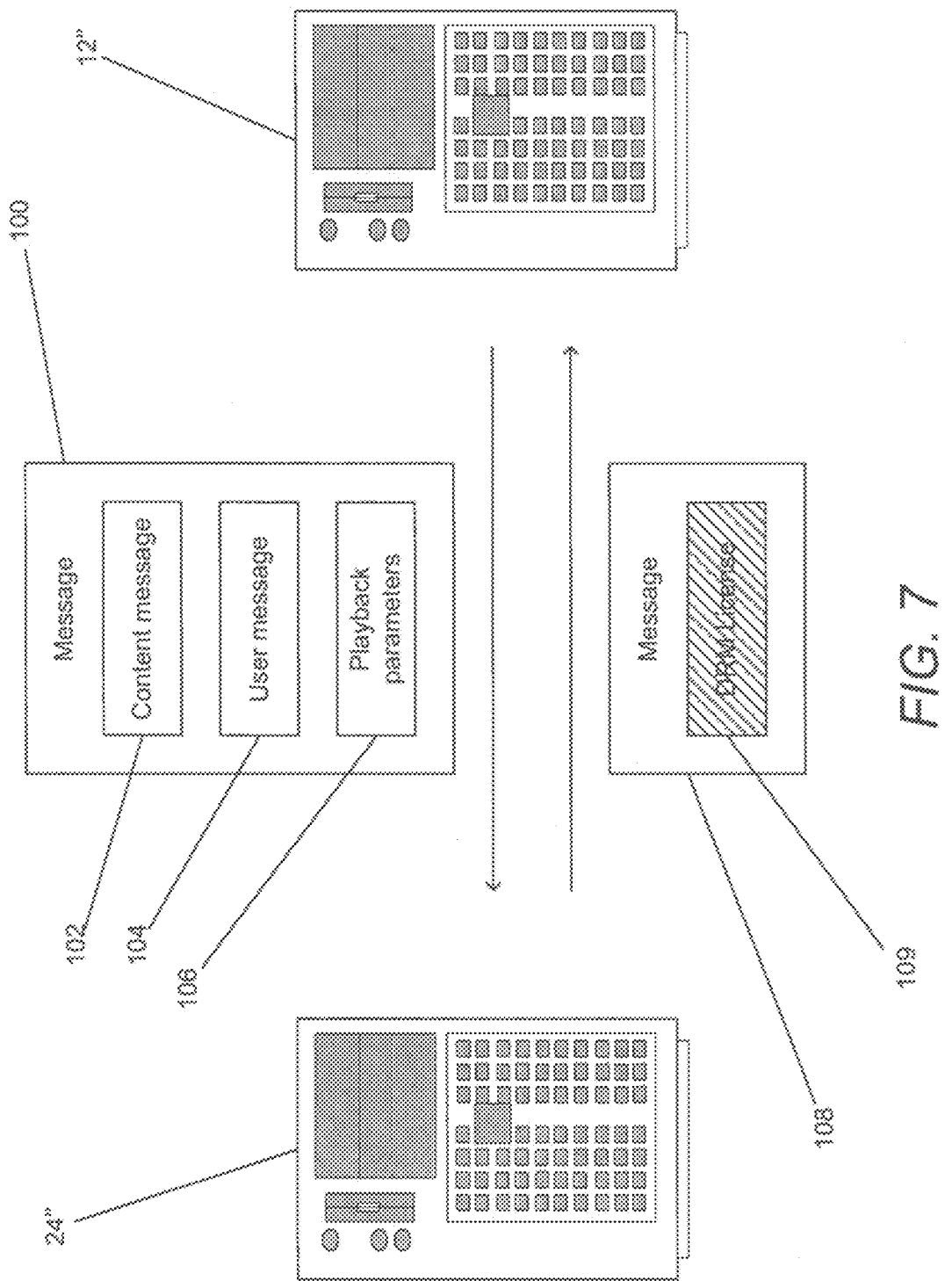
FIG. 7 is a schematic diagram showing an exchange of messages between a content server and a trusted system in accordance with an embodiment of the invention.

A server providing a trusted system with information for the generation of one or more playback certifications in accordance with an embodiment of the present invention is shown in FIG. 7. The server provides the trusted system with a message 100 that includes a content message 102, a user message 104 and instructions 106 concerning the type(s) of playback certification to generate. The trusted system receives the message 100 and replies with a message 108 that contains the playback certification(s) 109. The content message 102 contains one or more content keys issued by the content provider with respect to a specific piece of content and access control that governs the operations that can be performed by a trusted system with respect to that piece of content (e.g., whether the trusted system is allowed to generate a playback certification, the types of playback certifications that are allowed for that content and/or whether the content is bound to a user or bound to a media). The user message 104 contains the "user encryption keys" for the specific user that is requesting the content as well as access control governing what operations the user authorizes the trusted system to perform (e.g., limiting slot-based playback certifications to specific slots). The instructions 106 concerning the playback parameters of the playback certification being issued specify the manner in which a user can access the content.

The rights that can be granted by a content provider to users can be customized by the content provider and are typically based upon the content restrictions supported by playback devices registered within the federated system. For example, a content provider can provide general access to any registered device (a variation where no "user encryption key" or other form of restriction to a specific user is used in the generation of the playback certification).

Another type of playback certification is a persistent certification, where the content provider provides the user with rights and the content can be copied with the same playback certification(s). Where multiple playback certifications are provided to support multiple classes of device, each of the playback certifications is copied.

A slot based rental is a type of playback certification where content is certified for playback on a rental slot. For example, a user with eight slots can have up to eight rentals active at a time. When the ninth rental is certified, then the certification for one of the previous eight rentals automatically expires (i.e., the user loses the ability to access the content). With slot based rentals, the content can be copied with the same playback certification(s).

A count-based rental is a playback certification that enables the content to be used a fixed number of times, after which it expires. The content can be copied with the same playback certification(s). A time-expiration rental is a playback certification that grants access to content for a fixed period of time. The time period can be absolute (e.g., Jun. 2, 2006) or relative to the first time the content is used (e.g., 24-hour rental).

Another type of playback certification is fixed media copy protection. A fixed media copy protection playback certification is encrypted without using a "user encryption key" (i.e., is not tied to a user) and is bound to its original fixed media (e.g., flash media, optical disc, secure flash drive). Content assigned a fixed media copy protection playback certification cannot be copied. A recordable media copy protection certification is another type of playback certification that is technically protected without using a "user encryption key". The content may be initially downloaded and stored onto recordable media, but once recorded cannot be copied or re-recorded. Variations of this playback certification can enable a predetermined number of copies to be made securely from the original, progenitor copy. In addition to the above certifications, content can be protected using any of the above certifications and then sold via a subscription service.

In a number of embodiments, the content includes a playback certification that can be provided with the content as a guest certification. The guest certification can be used to enable extremely limited play back by a user in response to the recommendation of the content by another user. For example, the guest certification may enable a user receiving the content to view the content for a short period of time or a single time. In other embodiments, a user can enjoy a subscription and be entitled to playback all or predetermined subsets of available content while the subscription is in effect. In systems where subscriptions are supported, content can have an additional subscription playback certification associated with the content that governs the subscribers that can access the content.

As discussed above, many embodiments of the invention associate more than one playback certification with a single piece of content. When more than one playback certification is associated with a piece of content, a playback device can search for and use any playback certification that enables the content to be accessed by the playback device. Each of the playback certifications can specify different playback parameters, enable access to different users and/or enable access to different device groups. In a number of embodiments, a user can receive content with a particular type of certification (e.g. guest) and can obtain a different type of playback certification from the content provider. The user's device can then incorporate the different type of playback certification into the file that includes the content.

Figure 8:
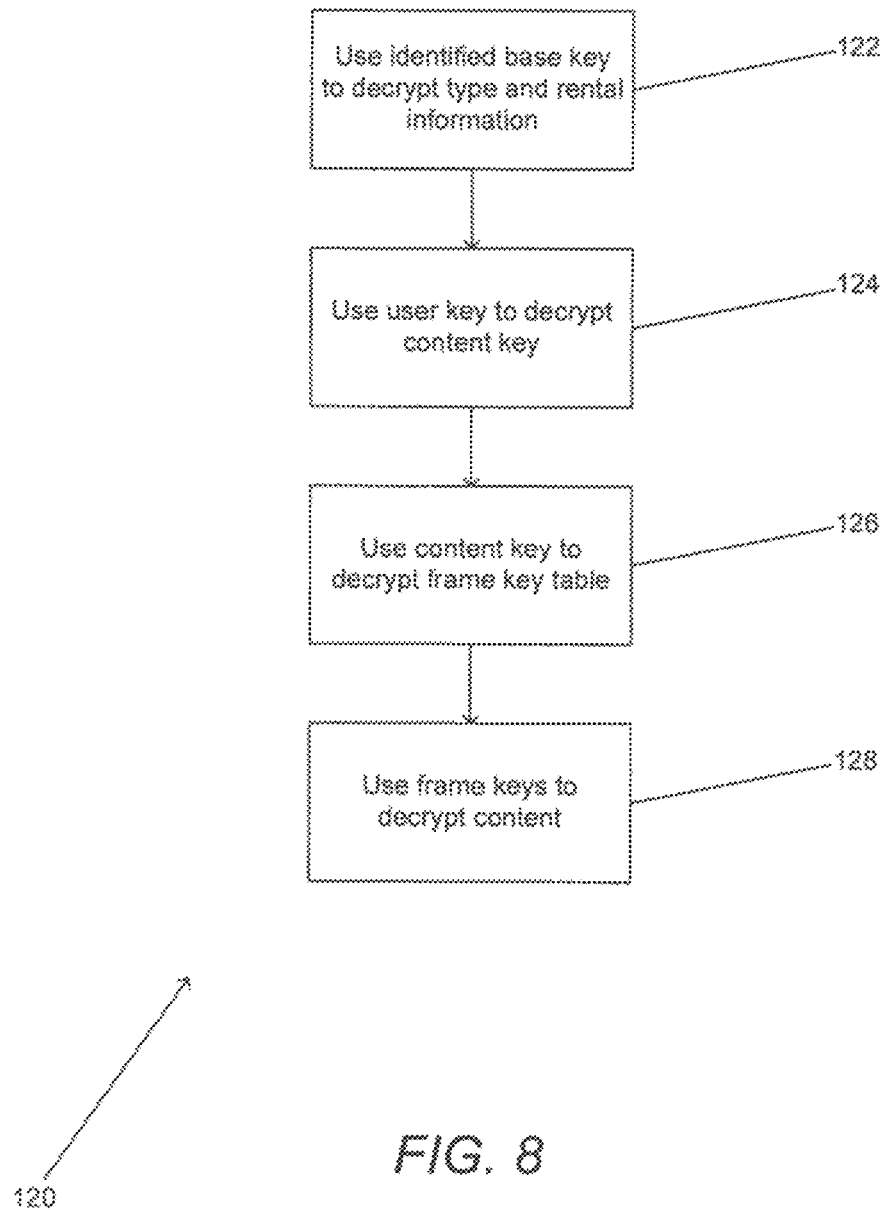
FIG. 8 is a flow chart showing a process for play back of technically protected content in accordance with an embodiment of the invention.
Figures 9A, 9B:
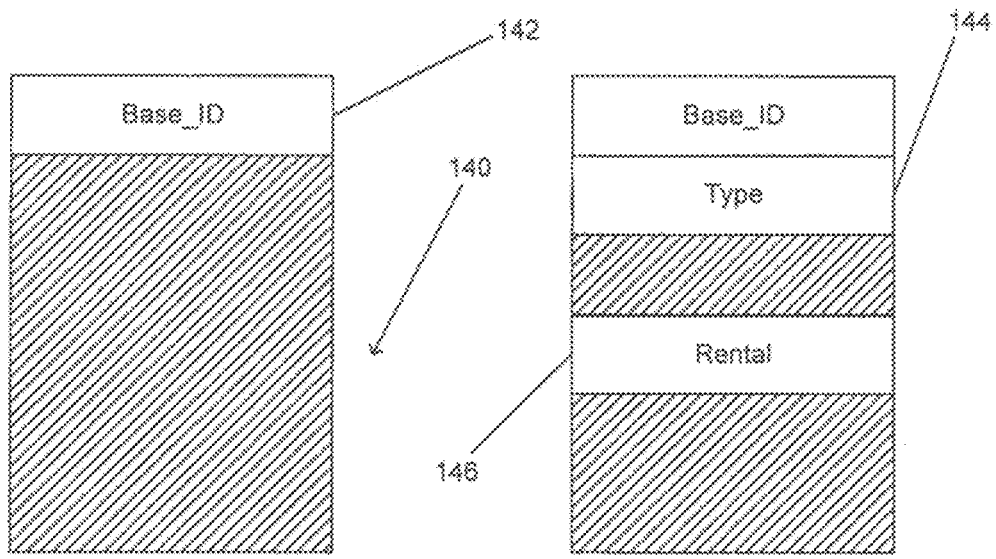
FIGS. 9A-9D are schematic representations of a playback certification showing portions of the playback certification that are encrypted at various stages during decryption of the playback certification in accordance with an embodiment of the present invention.
Figures 9C, 9D:
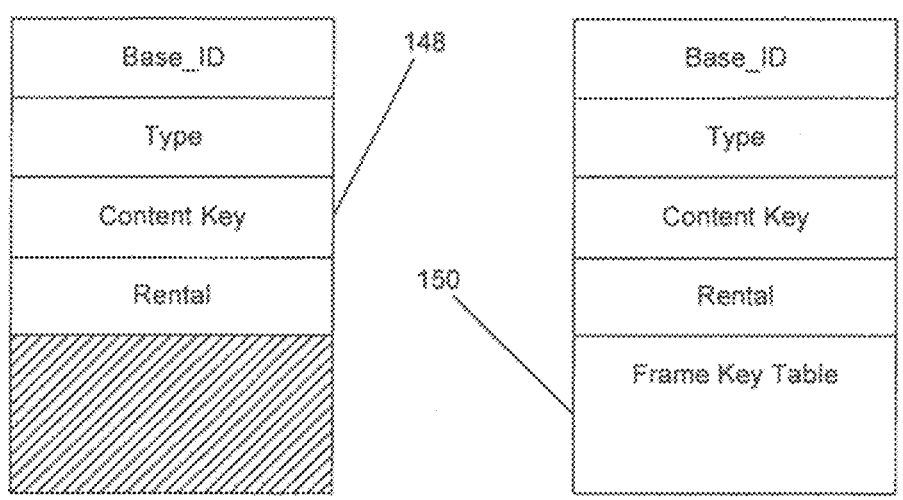

Once a file has been formed including the technically protected content and a playback certification, the file can be provided to a playback device. A process for accessing the content for playback in accordance with an embodiment of the present invention is shown in FIG. 8. The process 120 includes identifying (122) the active "base encryption key" for the particular class of device that is attempting to access the content, which can be used to access information concerning the type of playback parameters supported by the playback certification. The active "user encryption key" is then used to decrypt (124) the version of the "content encryption key" that was encrypted by the active "user encryption key". The "content encryption key" is then used to decrypt (126) the table of "frame encryption keys" used in the technical protections of the content. The table of "frame encryption keys" can then be used to play back (128) the content. Any decryption of the content typically occurs as the content is being viewed.

Information available in the clear during the decryption of a playback certification issued for devices that include a single base encryption key and a single user encryption key in accordance with an embodiment of the present invention is shown in FIGS. 9A-9D. The information within the playback certification 140 that is initially available in the clear 142 is the "Base_ID", which identifies the "base encryption key" used to encrypt information concerning the playback parameters supported by the playback certification. In the illustrated embodiment, the identified "base encryption key" is used to decrypt the "Type" 144 and the "Rental" 146 information. The "Type" 144 and the "Rental" 146 information specify the manner in which the user play back and otherwise deal with the content (e.g., "Rental" 146 can specify the rental slot occupied by the content). In other embodiments, the playback parameters are expressed using other combinations of information.

In embodiments where the "Type" information 144 indicates that general rights have been granted in the content (i.e., rights granted to all users), the "base encryption key" can also be used to decrypt the "content encryption key" 148. Otherwise, the "content encryption key" is decrypted using the "user encryption key" stored on the playback device. Once the "content encryption key" 148 is in the clear, it can be used to decrypt the table of "frame encryption keys". Once a playback device has the "frame encryption keys" the playback device has all of the information necessary to access the content and the "Type" 144 and the "Rental" 146 information regulate how the playback device accesses the content.

In the embodiment shown in FIGS. 9A-9D, the playback certification was issued with respect to devices that have a single "base encryption key" and a single "user encryption key". As discussed above, a single piece of content can have multiple playback certifications associated with it to accommodate various classes of device. Federated systems in accordance with many embodiments of the invention support the assignment of multiple "base encryption keys" to domains of devices and the assignment of multiple "user encryption keys" to a user account (typically only the active "user encryption key" is actually provided to the device at any given time). Therefore, playback certifications can be created that include multiple "base encryption keys" and multiple "user encryption keys". An advantage of using multiple keys is that over time individual keys can be retired or revoked and the remaining keys can still be used to access the content. In one embodiment, each of the "base encryption keys" is used to encrypt the same information. Similarly, each of the "user encryption keys" are used to encrypt the "content encryption key" 148. A table can be formed using each instance in which the information is encrypted using one of the multiple encryption keys. For example, playback certifications in accordance with many embodiments of the invention do not include a single "content encryption key" 148 encrypted using a "user encryption key" as is shown in FIGS. 9A-9D. Rather, the playback certifications include a table where each entry in the table is the "content encryption key" encrypted using a different "user encryption key". The same is also true with respect to tables of information encrypted with different "base encryption keys". The retirement and revocation of keys is discussed further below.

Figure 10A:
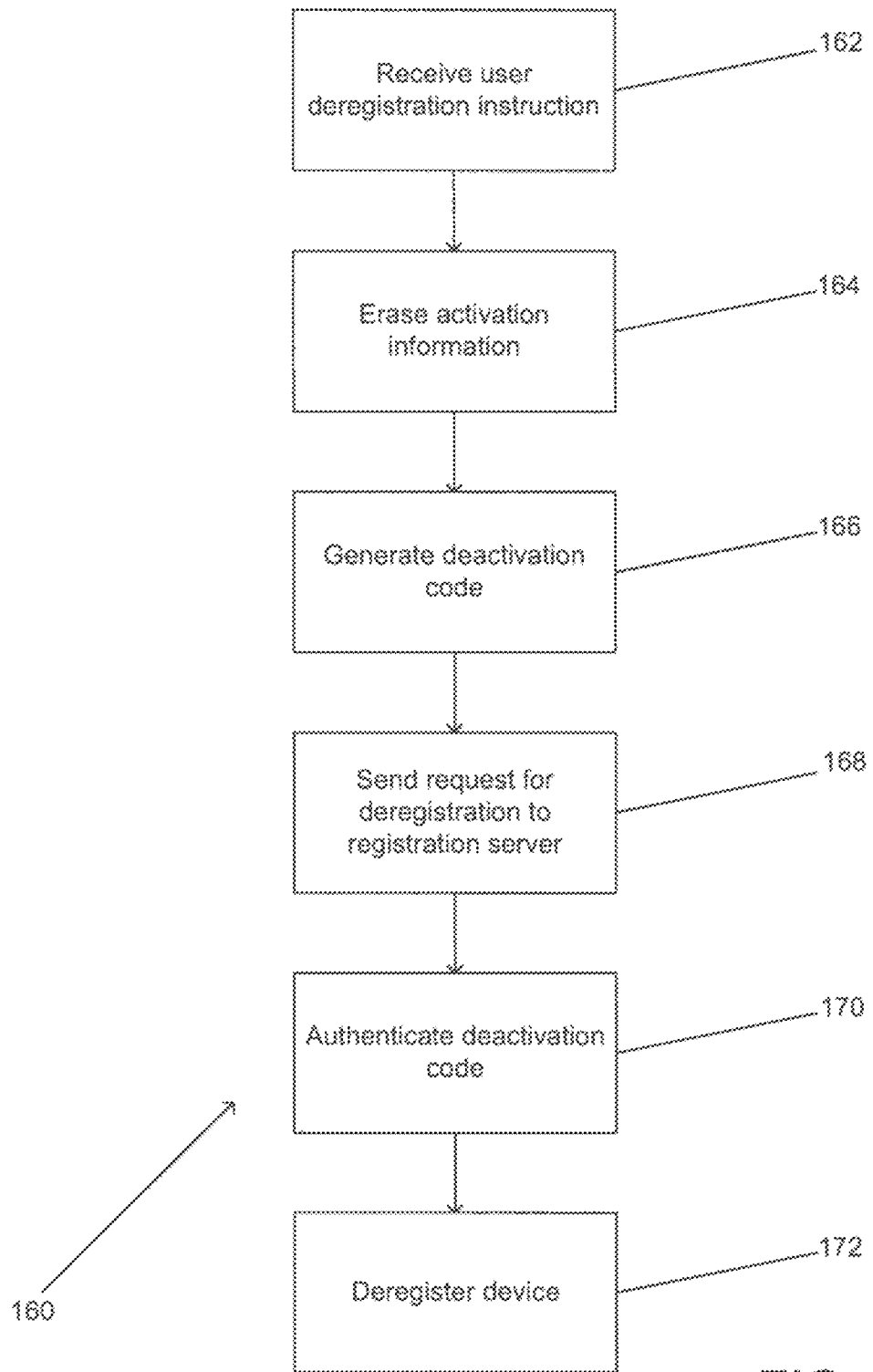
FIGS. 10A and 10B are flow charts showing processes for deregistering devices in accordance with embodiments of the invention.

Many embodiments of the invention enable users to deregister a device. For example, a user may wish to replace a device and register a new device. A process that a user can use to deregister a registered device is shown in FIG. 10A. The process 160 includes receiving (162) user instructions to deactivate the device. The user instruction typically includes a confirmation, which is due to the significance of the action being taken. The device then erases (164) the activation information (i.e., the activation record and/or installed activation keys) obtained during registration and generates (166) a deactivation code. The deactivation code can be generated using a predetermined processes that is seeded by at least some of the activation information. The deactivation code is transferred to the registration server as part of a deregistration request (168). The server authenticates (170) the deactivation code and then removes (172) the device from its register of activated devices. Although the process described above discusses the device itself communication the deactivation code to the registration server, the deactivation code can also be provided to the server via a third device such as a computer. In a number of embodiments, a deregistered device generates a deactivation code that the user provides to the server by manually entering the deactivation code via a web interface.

Figure 10B:
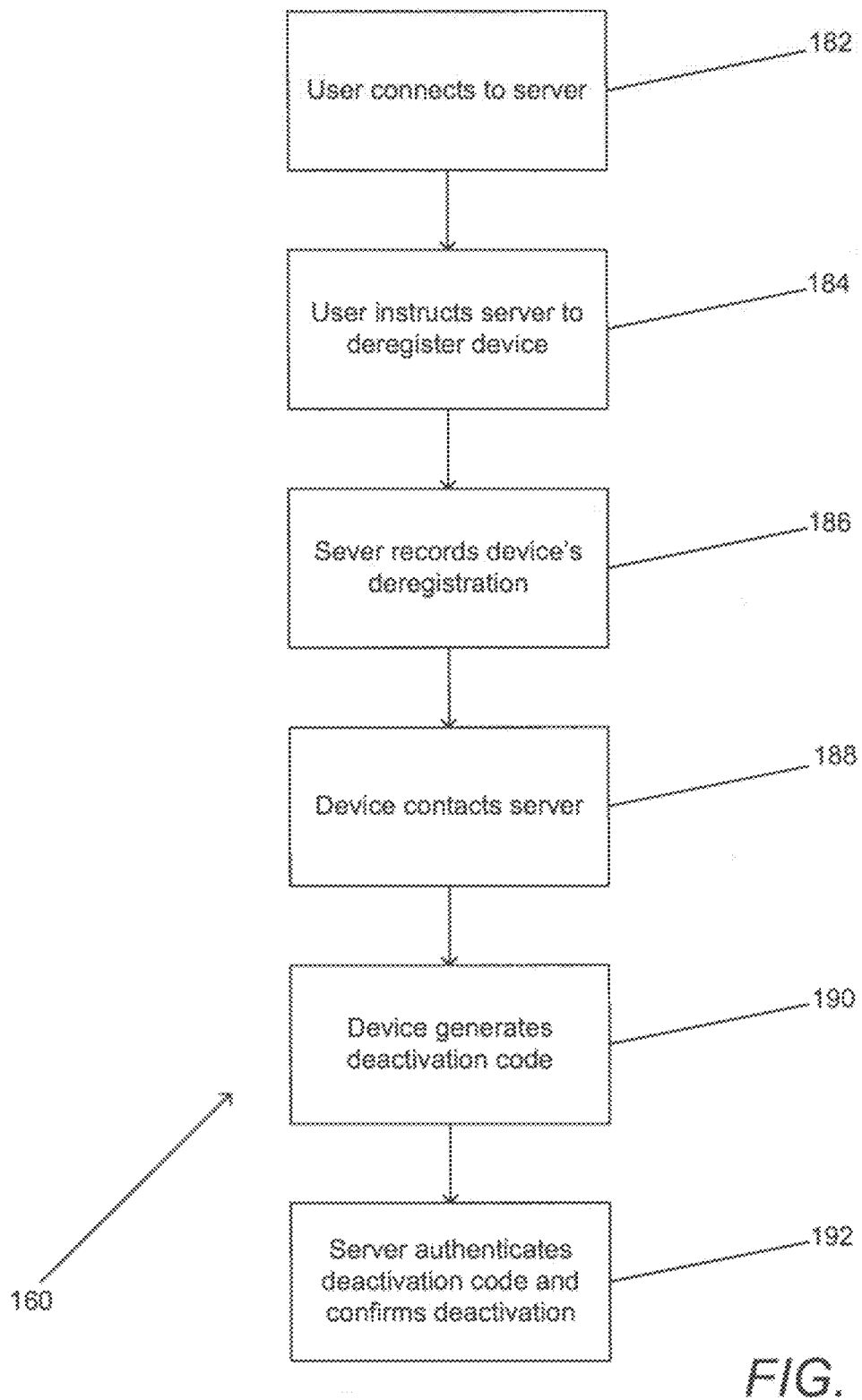

Another process for deregistering a device in accordance with an embodiment of the invention is shown in FIG. 10B. The process 160' is similar to the process 160 shown in FIG. 10A. The main difference is that the process 160' is a server initiated process. A user connects (180) to the server and instructs (182) the server to deactivate the device. The server records (184) that the device has been deactivated. The next time the device contacts (186) the server, the device learns of its deactivation and generates (188) a deactivation code that is sent (190) to the server. The server (192) authenticates the deactivation code to confirm that the device has been deactivated.

In addition to users deregistering devices, several embodiments of federated systems in accordance with the invention enable revocation of devices or "base encryption keys" associated with a class of device to prevent abuse of the system. Each type of revocation relies on the use of tables of information, where each entry in the table is the same piece of information (such as content key) encrypted using a different encryption key (see discussion above). A device's ability to access the information depends upon the particular encryption key the device possesses. When multiple different domains of devices exist, each domain can be issued a set of "base encryption keys". These keys can be protected using different scrambles for each system, but the underlying key material remains the same. For example the "Java Mobile Phone" domain can be defined to issue the same set of "base encryption keys" to every mobile phone that supports a Java operating system. However different models of receive different scrambles of the keys. If a key is compromised, it can be revoked by the registration server. As discussed above, "base encryption keys" are used to generate tables where each entry is a piece of information encrypted with a different "base encryption key". When a key is revoked, the key is no longer one of the keys used in the generation of the table. If the revoked key was extracted in a circumvention tool, that tool will no longer work.

Revocation of a specific device works in a similar fashion. In many embodiments, a device is provided with a single active "user encryption key" during registration. If the user's device is revoked, the user's active "user encryption key" will no longer be used as one of the encryption keys when forming a "content encryption key" table as part of a playback certification (see discussion above). If the revoked "user encryption key" was extracted in a circumvention tool, that tool will no longer work. The user's device must be registered again in order to obtain a new "user encryption key" that will enable the user to access any newly issued content. The new active "user encryption key" is one of the keys associated with the device by the registration server and is also one of the keys used by the federated system to encrypt the "content encryption key", when issuing a playback certification. Storing the full set of user keys at the registration server and providing user devices with a single "user encryption key" during registration facilitates key revocation. Content is protected for all "user encryption keys". If a "user encryption key" is leaked, then subsequent content will not be accessible with that key.

Key revocation can also be used to prevent abuses that may result from the discovery of a content provider's encryption keys. In many federated systems in accordance with embodiments of the invention, media key blocks are distributed to different content providers and a breach of security associated with a particular content provider's media key(s) can be minimized by deactivating that content provider's media key(s). Such a deactivation would not impact content provided by other content providers. Such a revocation would also not impact content previously provided to registered playback devices using the deactivated media key(s). The revocation would, however, prevent access to new content issued by the content distributor as the deactivated media key(s) would no longer provide access to the information within the new playback certifications required to play back the technically protected content.

While the above description contains many specific embodiments of the invention, these should not be construed as limitations on the scope of the invention, but rather as an example of one embodiment thereof. For example, the above system can be used to create a private player network for use in, for example, the secure distribution and viewing of pre-released content. In this scenario, the content provider could use a common "user encryption key" that is possessed by all devices within the private network to generate a playback certification. In other embodiments, the content provider can issue a playback certification that is associated with a device identification number and multiple playback certifications could be embedded in content to enable a user to play the content on each registered device. In addition, a greater number of entities within the system (i.e., more than simply the registration entity and the content provider) can be provided with an opportunity to contribute to the generation of the playback certification. Furthermore, a variety of encryption techniques in addition to those described above can be used in the encryption of content and the various pieces of information included in the playback certification. As an additional security measure, information included in the playback certification can be scrambled using a scramble function or a predetermined sequence of scramble functions selected from a set of scramble functions. Accordingly, the scope of the invention should be determined not by the embodiments illustrated, but by the appended claims and their equivalents.

What is claimed is:

1. A federated system for distributing encrypted multimedia content for playback comprising:
   a trusted registration server system configured to authorize distribution of encrypted content by a plurality of content provider server systems that utilize different digital rights management systems;
   wherein the trusted registration server system is configured to:
      maintain a set of user accounts;
      receive a first set of information for a piece of multimedia content from a first content provider server system from the plurality of content provider server systems, wherein the first content provider server system distributes content utilizing a first protection schema and the first set of information comprises:
         rights granted with respect to the piece of multimedia content; and
         a user ID associated with a first user account from the set of user accounts; and
      authorize distribution of the piece of multimedia content by a second content provider server system from the plurality of content provider server systems based on the first set of information, wherein the second content provider server system distributes content utilizing a different second protection schema;
   wherein the second content provider server system is configured to:
      store a first encrypted copy of the piece of multimedia content, where the first encrypted copy is encrypted using at least a content key;
      receive authorization to distribute the piece of multimedia content from the trusted registration server based on the first set of information;
      receive a request for the piece of multimedia content from the first media player; and
      provide a first encrypted copy of the piece of multimedia content and a first playback certification to the first media player, where:
         the first playback certification is generated according to the second protection schema after receiving authorization from the trusted registration server to distribute the piece of multimedia content and the request for the piece of multimedia content from the first media player; and
         the first playback certification enables playback of the first encrypted copy of the piece of multimedia content by the first media player.

2. The federated system of claim 1, wherein the first playback certification from the second content provider server system cannot be used with a second encrypted copy of the piece of multimedia content from a third content provider server system.

3. The federated system of claim 1, wherein the rights granted with respect to the piece of multimedia content are associated with the user ID.

4. The federated system of claim 1, wherein the rights granted with respect to the piece of multimedia content are associated with the first media player.

5. The federated system of claim 1, wherein the trusted registration server system authorizes distribution of the piece of multimedia content by communicating a second set of information for the piece of multimedia content to the second content provider server system, wherein the second set of information comprises rights associated with the piece of multimedia content for the first user account.

6. The federated system of claim 1, wherein the trusted registration server system is further configured to:
   receive a second set of information for a second piece of multimedia content from the second content provider server system, wherein the second set of information comprises:
      rights granted with respect to the second piece of multimedia content; and
      a user ID associated with the first user account from the set of user accounts; and
   authorize distribution of the second piece of multimedia content by the first content provider server system.

7. The federated system of claim 1, wherein the first playback certification comprises a set of one or more content encryption keys comprising the at least one content key for decrypting the first encrypted copy of the piece of multimedia content.

8. The federated system of claim 7, wherein the set of one or more content encryption keys is encrypted using a set of one or more user encryption keys.

9. The federated system of claim 8, wherein second content provider server system is further configured to maintain the set of user encryption keys.

10. The federated system of claim 7, wherein the at least one content key is used to generate a frame encryption key.

11. The federated system of claim 1, wherein the first playback certification is a first of a plurality of playback certifications for the piece of multimedia content, wherein each playback certification of the plurality of playback certifications enables playback of the piece of multimedia content by a different class of devices.

12. The federated system of claim 1, wherein the trusted registration server system is implemented using secure software that is tamper resistant.

13. The federated system of claim 1, wherein the trusted registration server system is implemented using secure hardware that is tamper resistant.

14. The federated system of claim 1, wherein the different digital rights management systems use different types of DRM licenses.

15. A method for distributing encrypted multimedia content for playback comprising:
   maintaining a set of user accounts;
   receiving a first set of information for a piece of multimedia content from a first content provider server system from a plurality of content provider server systems, wherein the first content provider server system distributes content utilizing a first protection schema and the first set of information comprises:
      rights granted with respect to the piece of multimedia content; and
      a user ID associated with a first user account from the set of user accounts; and
   authorizing distribution of the piece of multimedia content by a second content provider server system based on the first set of information, wherein the second content provider server system is configured to distribute content utilizing a different second protection schema, wherein the second content provider server system:

stores a first encrypted copy of the piece of multimedia content, where the first encrypted copy is encrypted using at least a content key;
receives authorization from a trusted registration server to distribute the piece of multimedia content;
receives a request for the piece of multimedia content from the first media player; and
provides a first encrypted copy of the piece of multimedia content and a first playback certification to the first media player, where:
 the first playback certification is generated according to the second protection schema after receiving authorization from the trusted registration server to distribute the piece of multimedia content and a request for the piece of multimedia content from the first media player, and
 the first playback certification enables playback of the first encrypted copy of the piece of multimedia content by the first media player.

16. The method of claim 15, wherein authorizing distribution of the piece of multimedia content comprises communicating a second set of information for the piece of multimedia content to the second content provider server system, wherein the second set of information comprises rights associated with the piece of multimedia content for the first user account.

17. The method of claim 15 further comprising:
receiving a second set of information for a second piece of multimedia content from the second content provider server system, wherein the second set of information comprises:
 rights granted with respect to the second piece of multimedia content; and
 a user ID associated with the first user account from the set of user accounts; and
authorizing distribution of the second piece of multimedia content by the first content provider server system.

18. The method of claim 17, wherein the at least one content encryption key is encrypted using a set of one or more user encryption keys.

19. The method of claim 14, wherein the at least one content key is used to generate a frame encryption key.

* * * * *